United States Patent
Wu et al.

(10) Patent No.: US 12,082,234 B2
(45) Date of Patent: Sep. 3, 2024

(54) METHOD AND DEVICE USED IN NODE FOR BEAM FAILURE RECOVERY IN WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 37 days.

(21) Appl. No.: 17/967,876

(22) Filed: Oct. 17, 2022

(65) Prior Publication Data

US 2023/0042989 A1 Feb. 9, 2023

Related U.S. Application Data

(63) Continuation of application No. 16/991,033, filed on Aug. 12, 2020, now Pat. No. 11,510,216.

(30) Foreign Application Priority Data

Aug. 26, 2019 (CN) .......................... 201910788289.0

(51) Int. Cl.
*H04W 72/04* (2023.01)
*H04L 5/00* (2006.01)
(Continued)

(52) U.S. Cl.
CPC ......... *H04W 72/542* (2023.01); *H04L 5/0048* (2013.01); *H04W 24/10* (2013.01)

(58) Field of Classification Search
CPC . H04W 72/542; H04W 5/0048; H04W 24/10; H04W 24/08; H04W 72/046; H04B 7/0695; H04B 7/00617
(Continued)

(56) References Cited

U.S. PATENT DOCUMENTS

2019/0245737 A1 8/2019 Zhou et al.
2019/0253966 A1 8/2019 Park et al.
(Continued)

FOREIGN PATENT DOCUMENTS

CN   108111286 A   6/2018
CN   108631889 A   10/2018
(Continued)

OTHER PUBLICATIONS

CN Notice to grant patent right for invention received in application No. 201910788289.0 dated May 6, 2022.
(Continued)

*Primary Examiner* — Maharishi V Khirodhar

(57) ABSTRACT

Disclosed are a method and a device in a node for beam failure recovery in wireless communication. A first node receives M1 first-type reference signals, receives M2 first-type reference signals, and then transmits a first radio signal on a target radio resource. Measurements for the M1 first-type reference signals are used for generating first radio-link quality, and measurements for the M2 first-type reference signals are used for generating second radio-link quality; the first radio-link quality and the second radio-link quality are used for determining the target radio resource and the first radio signal; the target radio resource is one of a first radio resource, a second radio resource or a third radio resource; the first radio resource and the second radio resource cor-
(Continued)

(a) when first radio-link quality being inferior to first threshold, and second radio link quality being not inferior to second threshold (b) when first radio link quality being not inferior to first threshold, and second radio link quality being inferior to second threshold (c) when first radio link quality being inferior to first threshold, and second radio link quality being inferior to second threshold respond to a first index and a second index respectively; the first index is used for determining the M1 first-type reference signals.

20 Claims, 15 Drawing Sheets

(51) Int. Cl.
*H04W 24/10* (2009.01)
*H04W 72/542* (2023.01)
*H04W 76/00* (2018.01)
*H04W 88/08* (2009.01)

(58) Field of Classification Search
USPC .......................................................... 370/329
See application file for complete search history.

(56) References Cited

U.S. PATENT DOCUMENTS

2020/0128586 A1* 4/2020 Takahashi ......... H04W 74/0833
2022/0103225 A1* 3/2022 Ling .................... H04B 7/0695

FOREIGN PATENT DOCUMENTS

CN 108633043 A 10/2018
CN 110167036 A 8/2019

OTHER PUBLICATIONS

CN 1st Search Report received in application No. 201910788289.0 dated Apr. 22, 2022.
3GPP tsg_ran\WG1_RL1 Ad-Hoc chair(Qualcomm) R1-1711916 "Chairmanamp;apos;s notes of A5.1.2 MIMO" Jun. 30, 2017.
Huawei,R1-17099221,discussion on remaining issues of raldio link monitoring, Qingdao,Jun. 27-30, 2017.(Year:2017).
Qualcomm(r2-1805201, Discussion of RLF caused by beam faillre recovery, Sanya, China, Apr. 16-20, 2018) (Year: 2018).
Samsung,R1-1717606.beam failure recovery,Oct. 9-13, 2017 (Year: 2017).
MediaTek,R2-1700898.RLM and RLF in HF NR,Feb. 13-17, 2017 (Year:2017).

* cited by examiner

US 12,082,234 B2

METHOD AND DEVICE USED IN NODE FOR BEAM FAILURE RECOVERY IN WIRELESS COMMUNICATION

CROSS REFERENCE TO RELATED APPLICATIONS

This application is the continuation of the U.S. patent application Ser. No. 16/991,033, filed on Aug. 12, 2020, which claims the priority benefit of Chinese Patent Application No. 201910788289.0, filed on Aug. 26, 2019. The full disclosure of which is incorporated herein by reference.

BACKGROUND

Technical Field

The present disclosure relates to a transmission method and device in a wireless communication system, and in particular to a transmission method and device for radio signals in a wireless communication system supporting a cellular network.

Related Art

In 5G New Radio (NR), Massive Multi-Input Multi-Output (MIMO) is a key technology. In the massive MIMO, multiple antennas based on beamforming to form a relatively narrow beam which points to a particular direction to improve the quality of communication. In 5G NR, in order to ensure a rapid recovery when a beam fails, a beam failure recovery mechanism has been adopted, that is, User Equipment (UE) measures a serving beam in communication process, when the serving beam is found to be poor, the beam failure recovery mechanism is activated, so that base station replaces the serving beam. The Beam failure recovery mechanism comprises a beam failure detection, a new candidate beam identification, a beam failure recovery request transmission and monitoring response for beam failure recovery request.

In 5G NR system, the base station and/or terminal equipment will be equipped with multiple antenna panels. The beam failure recovery mechanism under multi-base-station and/or multi-antenna-panel needs to be further considered.

SUMMARY

In 5G NR system, for multi-base-station and/or multi-antenna-panel, it is a key problem to design an appropriate beam failure recovery mechanism considering whether part or all of base stations or multi-antenna panels fail.

In view of the above problem, the present disclosure provides a solution. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred.

The present disclosure provides a method in a first node for wireless communication, comprising:

receiving M1 first-type reference signals, measurements for the M1 first-type reference signals being used for generating first radio-link quality, M1 being a positive integer greater than 1;

receiving M2 first-type reference signals, measurements for the M2 first-type reference signals being used for generating second radio-link quality, M2 being a positive integer greater than 1; and transmitting a first radio signal on a target radio resource;

wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one embodiment, a problem needed to be solved in the present disclosure is: the beam failure recovery mechanism when multi-base-station or base station is equipped with multi-antenna-panel is a key issue that needs to be studied.

In one embodiment, a problem needed to be solved in the present disclosure is: in the case of multi-base-station or base station equipped with multi-antenna-panel, how to select radio resources for transmitting a beam failure recovery request is a key issue that needs to be studied.

In one embodiment, a problem needed to be solved in the present disclosure is: the beam failure recovery mechanism when UE is equipped with multi-antenna-panel is a key issue that needs to be studied.

In one embodiment, a problem needed to be solved in the present disclosure is: in the case of UE equipped with multi-antenna-panel, how to select radio resources for transmitting a beam failure recovery request is a key issue that needs to be studied.

In one embodiment, the essence of the above method is that a first index and a second index correspond to a first base station and a second base station respectively, M1 first-type reference signals and M2 first-type reference signals are used for a beam failure detection for the first base station and a beam failure detection for the second base station, and at least one of the two base stations transmits a beam failure; a first radio signal is used for a beam failure recovery request, a target receiver transmitted on a first radio resource is the first base station, a target receiver transmitted on a second radio resource is the second base station, and radio resources used for transmitting the beam failure recovery request are determined according to a beam failure occurring on which base station. The advantage of adopting the above method is that when determining radio resources for transmitting the beam failure recovery request, a beam failure occurring on which base station is considered and a rapid beam recovery is realized for the base station.

In one embodiment, the essence of the above method is that a first index and a second index respectively correspond to two antenna panels (two antenna panels configured in base station or two antenna panels configured in UE), M1 first-type reference signals and M2 first-type reference signals are respectively used for a beam failure detection for a first antenna panel and a beam failure detection for a second antenna panel, and a transmission on at least one of the two panels transmits a beam failure; a first radio signal is used for a beam failure recovery request, a target receiver transmitted on a first radio resource (two antenna panels are configured in base station) or a target transmitter (two antenna panels are configured in UE) is a first antenna panel, a target receiver transmitted on a second radio resource (two antenna panels are configured in base station) or a target transmitter (two antenna panels are configured in UE) is a second antenna panel, radio resources for transmitting the beam failure recovery request are determined according to a beam failure occurring on which base station. The advantage of adopting the above method is that when determining radio resources for transmitting a beam failure recovery request, a beam failure occurring on which antenna panel is considered and a rapid beam recovery is realized for the antenna panel.

According to one aspect of the present disclosure, the above method is characterized in that the first radio resource and the second radio resource are both reserved for a first-type physical-layer channel, and the third radio resource is reserved for a second-type physical-layer channel, the first-type physical-layer channel and the second-type physical-layer channel being different.

In one embodiment, the essence of the above method is that the first-type physical-layer channel is a PUCCH, and the second-type physical-layer channel is a PRACH.

According to one aspect of the present disclosure, the above method is characterized in that when the first radio-link quality is worse than the first threshold and the second radio-link quality is not worse than the second threshold, the target radio resource is the second radio resource; when the first radio-link quality is not worse than the first threshold and the second radio-link quality is worse than the second threshold, the target radio resource is the first radio resource; when the first radio-link quality is worse than the first threshold and the second radio-link quality is worse than the second threshold, the target radio resource is the third radio resource.

In one embodiment, the essence of the above method is that when a beam failure occurs in only one of two base stations or two antenna panels, a beam failure recovery request for one base station or one antenna panel that has the beam failure can be transmitted on an radio resource (a first radio resource or a second radio resource) of the other base station or antenna panel that does not have the beam failure; when two base stations both have beam failures, a beam failure recovery request for the two base stations can be transmitted on a third radio resource.

According to one aspect of the present disclosure, the above method is characterized in comprising:
receiving third information, the third information being used for indicating N1 second-type reference signals; and
receiving fourth information, the fourth information being used for indicating N2 second-type reference signals;
when the target radio resource is the second radio resource, receiving the N1 second-type reference signals, measurements for the N1 second-type reference signals being respectively used for generating N1 second-type measurement values;
when the target radio resource is the first radio resource, receiving the N2 second-type reference signals, measurements for the N2 second-type reference signals being respectively used for generating N2 second-type measurement values.
wherein the first index is used for determining the N1 second-type reference signals, and the second index is used for determining the N2 second-type reference signals; a target reference signal is used for generating the first radio signal; when the target radio resource is the second radio resource, the target reference signal is one of the N1 second-type reference signals; when the target radio resource is the first radio resource, the target reference signal is one of the N2 second-type reference signals; N1 is a positive integer greater than 1, and N2 is a positive integer greater than 1.

In one embodiment, the essence of the above method is that N1 second-type reference signals and N2 second-type reference signals are respectively candidate beams for two base stations or two antenna panels, and a beam failure recovery request carries a new beam; a first radio resource corresponding to a first base station and a first antenna panel are used for transmitting a new beam of a second base station or a second antenna panel, and a second radio resource corresponding to a second base station or a second antenna panel are used for transmitting a new beam of a first base station or a first antenna panel.

According to one aspect of the present disclosure, the above method is characterized in comprising:
transmitting a first report; and
receiving first indication information;
wherein the first report is used for indicating P1 second-type reference signal(s); the first indication information is used for indicating the target reference signal, the target reference signal being one of the P1 second-type reference signal(s), P1 being a positive integer; when the target radio resource is the second radio resource, size relationships respectively between the N1 second-type measured values and N1 first-type thresholds are used for determining the P1 second-type reference signal(s) out of the N1 second-type reference signals; when the target radio resource is the first radio resource, size relationships respectively between the N2 second-type measured values and N2 first-type thresholds are used for determining the P1 second-type reference signal(s) out of the N2 second-type reference signals.

In one embodiment, the essence of the above method is that P1 second-type reference signal(s) is(are) P1 candidate beam(s) recommended by a physical layer to a higher layer, and a target reference signal is a new beam determined by a higher layer.

According to one aspect of the present disclosure, the above method is characterized in comprising:
receiving second information;
wherein the second information is used for indicating the first radio resource, the second radio resource and the third radio resource.

According to one aspect of the present disclosure, the above method is characterized in comprising:
receiving first information;
wherein the first information is used for determining the first index and the second index.

The present disclosure provides a method in a second node for wireless communication, comprising:
transmitting M1 first-type reference signals, measurements for the M1 first-type reference signals being used for generating first radio-link quality, M1 being a positive integer greater than 1;
transmitting M2 first-type reference signals, measurements for the M2 first-type reference signals being used for generating second radio-link quality, M2 being a positive integer greater than 1; and
receiving a first radio signal on a target radio resource;
wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

According to one aspect of the present disclosure, the above method is characterized in that the first radio resource and the second radio resource are both reserved for a first-type physical-layer channel, and the third radio resource is reserved for a second-type physical-layer channel, the first-type physical-layer channel and the second-type physical-layer channel being different.

According to one aspect of the present disclosure, the above method is characterized in that when the first radio-link quality is worse than the first threshold and the second radio-link quality is not worse than the second threshold, the target radio resource is the second radio resource; when the first radio-link quality is not worse than the first threshold and the second radio-link quality is worse than the second threshold, the target radio resource is the first radio resource; when the first radio-link quality is worse than the first threshold and the second radio-link quality is worse than the second threshold, the target radio resource is the third radio resource.

According to one aspect of the present disclosure, the above method is characterized in comprising:
  transmitting third information, the third information being used for indicating N1 second-type reference signals;
  transmitting fourth information, the fourth information being used for indicating N2 second-type reference signals;
  transmitting the N1 second-type reference signals; and
  transmitting the N2 second-type reference signals;
  wherein the first index is used for determining the N1 second-type reference signals, and the second index is used for determining the N2 second-type reference signals; a target reference signal is used for generating the first radio signal; when the target radio resource is the second radio resource, the target reference signal is one of the N1 second-type reference signals; when the target radio resource is the first radio resource, the target reference signal is one of the N2 second-type reference signals; N1 is a positive integer greater than 1, and N2 is a positive integer greater than 1.

According to one aspect of the present disclosure, the above method is characterized in comprising:
  transmitting second information;
  wherein the second information is used for indicating the first radio resource, the second radio resource and the third radio resource.

According to one aspect of the present disclosure, the above method is characterized in comprising:
  transmitting first information;
  wherein the first information is used for determining the first index and the second index.

The present disclosure provides a first node for wireless communication, comprising:
  a first receiver, receiving M1 first-type reference signals, measurements for the M1 first-type reference signals being used for generating first radio-link quality, M1 being a positive integer greater than 1; receiving M2 first-type reference signals, measurements for the M2 first-type reference signals being used for generating second radio-link quality, M2 being a positive integer greater than 1; and
  a first transmitter, transmitting a first radio signal on a target radio resource;
  wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

The present disclosure provides a second node for wireless communication, comprising:
  a second transmitter, transmitting M1 first-type reference signals, measurements for the M1 first-type reference signals being used for generating first radio-link quality, M1 being a positive integer greater than 1; transmitting M2 first-type reference signals, measurements for the M2 first-type reference signals being used for generating second radio-link quality, M2 being a positive integer greater than 1; and
  a second receiver, receiving a first radio signal on a target radio resource;
  wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one embodiment, the method in the present disclosure is advantageous in the following aspects:

The present disclosure proposes a beam failure recovery mechanism in the case of multi-base-station and multi-antenna-panel.

The present disclosure proposes a scheme of how to select radio resources for transmitting a beam failure recovery request in the case of multi-base-station and multi-antenna-panel.

In the method proposed in the present disclosure, when determining radio resources for transmitting a beam failure recovery request, which base station or antenna panel has a beam failure is considered, and a fast beam recovery is realized for the base station or antenna panel that has a beam failure.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
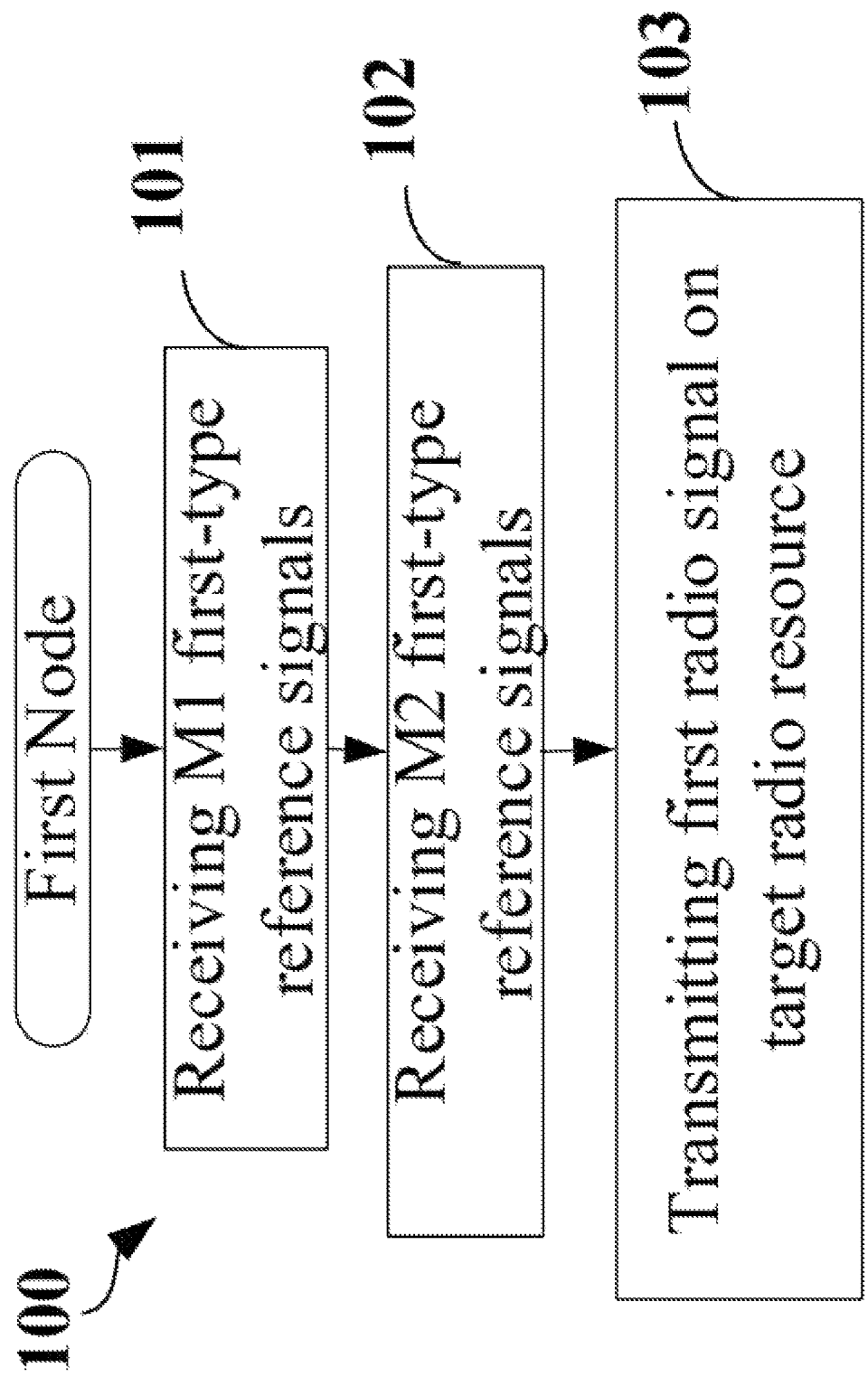
FIG. 1 illustrates a flowchart of M1 first-type reference signals, M2 first-type reference signals and a first radio signal according to one embodiment of the present disclosure.

Embodiment 1 illustrates a flowchart of M1 first-type reference signals, M2 first-type reference signals and a first radio signal according to one embodiment of the present disclosure, as shown in FIG. 1. In FIG. 1, each box represents a step. It should be noted that the order of each box in the figure does not represent the chronological relationship between the steps presented.

In Embodiment 1, the first node receives M1 first-type reference signals in step 101, measurements for the M1 first-type reference signals being used for generating first radio-link quality, M1 being a positive integer greater than 1; receives M2 first-type reference signals in step 102, measurements for the M2 first-type reference signals being used for generating second radio-link quality, M2 being a positive integer greater than 1; and transmits a first radio signal on a target radio resource in step 103; herein, the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one embodiment, any two first-type reference signals among the M1 first-type reference signals and the M2 first-type reference signals are different.

In one embodiment, the M1 first-type reference signals comprise a Channel State Information-Reference Signal (CSI-RS).

In one embodiment, the M2 first-type reference signals comprise a CSI-RS.

In one embodiment, the M1 first-type reference signals comprise a periodic CSI-RS.

In one embodiment, the M2 first-type reference signals comprise a periodic CSI-RS.

In one embodiment, the M1 first-type reference signals comprise at least one of a CSI-RS or a Synchronization Signal/Physical Broadcast CHannel (SS/PBCH) Block.

In one embodiment, the M2 first-type reference signals comprise at least one of a CSI-RS or a SS/PBCH Block.

In one embodiment, the M1 first-type reference signals are used for a beam failure detection in a beam failure recovery mechanism.

In one embodiment, the M2 first-type reference signals are used for a beam failure detection in a beam failure recovery mechanism.

In one embodiment, a beam failure recovery mechanism covers a beam failure detection, a new candidate beam identification, a beam failure recovery request transmission and monitoring response for beam failure recovery request.

In one embodiment, the specific definition of beam failure recovery mechanism can be found in 3GPP TS38.213, chapter 6.

In one embodiment, the M1 first-type reference signals are $\bar{q}_0$s, and the specific definition of $\bar{q}_0$ can be found in 3GPP TS38.213, chapter 6.

In one embodiment, the M2 first-type reference signals are $\bar{q}_0$s, and the specific definition of $\bar{q}_0$ can be found in 3GPP TS38.213, chapter 6.

In one embodiment, the M1 first-type reference signals are configured by failureDetectionResources, and the specific definition of the failureDetectionResources can be found in 3GPP TS38.213, chapter 6.

In one embodiment, the M2 first-type reference signals are configured by failureDetectionResources, and the specific definition of the failureDetectionResources can be found in 3GPP TS38.213, chapter 6.

In one embodiment, the M1 is predefined.

In one embodiment, the M2 is predefined.

In one embodiment, the M1 is configurable.

In one embodiment, the M2 is configurable.

In one embodiment, the M1 is configured by maxNrofFailureDetectionResources, and the specific definition of the maxNrofFailureDetectionResources can be found in 3GPP TS38.331, chapter 6.3.2.

In one embodiment, the M2 is configured by maxNrofFailureDetectionResources, and the specific definition of the maxNrofFailureDetectionResources can be found in 3GPP TS38.331, chapter 6.3.2.

In one embodiment, the M1 first-type reference signals are semi-statically configured.

In one embodiment, the M2 first-type reference signals are semi-statically configured.

In one embodiment, the above method comprises:
receiving sixth information; and
receiving seventh information;
wherein the sixth information is used for indicating the M1 first-type reference signals, and the seventh information is used for indicating the M2 first-type reference signals.

In one subembodiment of the above embodiment, the sixth information is semi-statically configured.

In one subembodiment of the above embodiment, the sixth information is carried by a higher-layer signaling.

In one subembodiment of the above embodiment, the sixth information is carried by an RRC signaling.

In one subembodiment of the above embodiment, the sixth information comprises a positive integer number of IE(s) in an RRC signaling.

In one subembodiment of the above embodiment, the sixth information comprises multiple IEs in an RRC signaling.

In one subembodiment of the above embodiment, the sixth information comprises all or part of an IE in an RRC signaling.

In one subembodiment of the above embodiment, the sixth information comprises failureDetectionResources, the specific definition of the failureDetectionResources can be found in 3GPP TS38.213, chapter 6.

In one subembodiment of the above embodiment, the seventh information is semi-statically configured.

In one subembodiment of the above embodiment, the seventh information is carried by a higher-layer signaling.

In one subembodiment of the above embodiment, the seventh information is carried by an RRC signaling.

In one subembodiment of the above embodiment, the seventh information comprises a positive integer number of IE(s) in an RRC signaling.

In one subembodiment of the above embodiment, the seventh information comprises multiple IEs in an RRC signaling.

In one subembodiment of the above embodiment, the seventh information comprises all or part of an IE in an RRC signaling.

In one subembodiment of the above embodiment, the seventh information comprises failureDetectionResources, the specific definition of the failureDetectionResources can be found in 3GPP TS38.213, chapter 6.

In one subembodiment of the above embodiment, the sixth information and the seventh information belong to a same IE in an RRC signaling.

In one subembodiment of the above embodiment, the sixth information and the seventh information respectively belong to two IEs in an RRC signaling.

In one subembodiment of the above embodiment, the sixth information is used for indicating the first index and the M1 first-type reference signals, and the seventh information is used for indicating that the second index corresponds to the M2 first-type reference signals.

In one embodiment, the first node monitors a downlink physical-layer control channel in a first time-frequency-resource set and a second time-frequency-resource set, the M1 first-type reference signals comprise part or all of reference signals indicated by a positive integer number of Transmission Configuration Indicator (TCI) State(s) used in monitoring the downlink physical-layer control channel in the first time-frequency-resource set, and the M2 first-type reference signals comprise part or all of reference signals indicated by a positive integer number of TCI State(s) used in monitoring the downlink physical-layer control channel in the second time-frequency-resource set.

In one subembodiment of the above embodiment, the first time-frequency-resource set and the second time-frequency-resource set respectively correspond to the first index and the second index.

In one subembodiment of the above embodiment, the first time-frequency-resource set comprises a positive integer number of COntrol REsource SET(s) (CORESET), and the second time-frequency-resource set comprises a positive integer number of CORESET(s).

In one subembodiment of the above embodiment, the first time-frequency-resource set comprises a positive integer number of search space set(s), and the second time-frequency-resource set comprises a positive integer number of search space set(s).

In one subembodiment of the above embodiment, the first time-frequency-resource set comprises a positive integer number of search space(s), and the second time-frequency-resource set comprises a positive integer number of search space(s).

In one subembodiment of the above embodiment, the first time-frequency-resource set comprises a positive integer number of downlink physical-layer control channel candidate(s), and the second time-frequency-resource set comprises a positive integer number of downlink physical-layer control channel candidate(s).

In one subembodiment of the above embodiment, a TCL state can be used for determining a multi-antenna relevant reception of the downlink physical-layer control channel.

In one subembodiment of the above embodiment, a reference signal indicated by a TCI state is used for determining a multi-antenna relevant reception of the downlink physical-layer control channel, and a reference signal indicated by a TCI state comprises one of a CSI-RS, an SRS or a SS/PBCH block.

In one subembodiment of the above embodiment, a reference signal indicated by a TCI state is used for determining a multi-antenna relevant reception of the downlink physical-layer control channel, and a reference signal indicated by a TCI state comprises one of a CSI-RS or a SS/PBCH block.

In one embodiment, the downlink physical-layer control channel is a Physical Downlink Control CHannel (PDCCH).

In one embodiment, the downlink physical-layer control channel is an Enhanced PDCCH (EPDCCH).

In one embodiment, the downlink physical-layer control channel candidate is a short PDCCH (sPDCCH).

In one embodiment, the downlink physical layer control channel candidate is a Narrow Band PDCCH (NB-PDCCH).

In one embodiment, the first radio-link quality comprises a first-type measured value, and the second radio-link quality comprises a first-type measured value.

In one embodiment, the first radio-link quality comprises M1 first-type measured values, measurements for the M1 first-type reference signals being respectively used for determining the M1 first-type measured values; the second radio-link quality comprises M2 first-type measured values, measurements for the M2 first-type reference signals being respectively used for determining the M2 first-type measured values.

In one embodiment, the first radio-link quality comprises at least M1 first-type measured values, any first-type measured value in the first radio-link quality is determined by a measurement for a first-type reference signal among the M1 first-type reference signals; and the second radio-link quality comprises at least M2 first-type measured values, any first-type measured value in the second radio-link quality is determined by a measurement for a first-type reference signal among the M2 first-type reference signals.

In one embodiment, the first-type measured value is a Block Error Rate (BLER) value.

In one embodiment, the first-type measured value is a hypothetical BLER value.

In one embodiment, the first-type measured value is a Reference signal received power (RSRP) value.

In one embodiment, the first-type measured value is a Reference signal received quality (RSRQ) value.

In one embodiment, measurements for the M1 first-type reference signals are used for determining M1 receiving quality, the M1 receiving quality being used for determining the first radio-link quality; and measurements for the M2 first-type reference signals are used for determining M2 receiving quality, the M2 receiving quality being used for determining the second radio-link quality.

In one subembodiment of the above embodiment, each of the M1 receiving quality is RSRP, and each of the M2 receiving quality is RSRP.

In one subembodiment of the above embodiment, each of the M1 receiving quality is a Signal-to-Noise Ratio (SNR), and each of the M2 receiving quality is an SNR.

In one subembodiment of the above embodiment, each of the M1 receiving quality is a Signal-to-Interference plus Noise Ratio (SINR), and each of the M2 receiving quality is an SINR.

In one subembodiment of the above embodiment, each of the M1 receiving quality is RSRQ, and each of the M2 receiving quality is RSRQ.

In one embodiment, any two radio resources among the first radio resource, the second radio resource and the third radio resource are orthogonal.

In one embodiment, the radio resources comprise at least one of time-domain resources, frequency-domain resources, code-domain resources or spatial-domain resources.

In one embodiment, the radio resources comprise time-domain resources and frequency-domain resources.

In one embodiment, the radio resources comprise time-domain resources, frequency-domain resources, code-domain resources and spatial-domain resources.

In one embodiment, the radio resources comprise code-domain resources.

In one embodiment, the first radio resource and the third radio resource are allocated to different types of physical-layer channels.

In one embodiment, the second radio resource and the third radio resource are allocated to different types of physical-layer channels.

In one embodiment, the first radio resource and the second radio resource are allocated to a same type of physical-layer channel.

In one embodiment, the first radio resource is allocated to an uplink physical-layer control channel.

In one embodiment, the second radio resource is allocated to an uplink physical-layer control channel.

In one embodiment, the uplink physical-layer control channel is a Physical Uplink Control CHannel (PUCCH).

In one embodiment, the uplink physical-layer control channel is a short PUCCH (sPUCCH).

In one embodiment, the uplink physical-layer control channel is a Narrow Band PUCCH (NB-PUCCH).

In one embodiment, the third radio resource is allocated to an uplink physical-layer random access channel.

In one embodiment, the third radio resource is configured by PRACH-ResourceDedicatedBFR, and the specific definition of the PRACH-ResourceDedicatedBFR can be found in 3GPP TS38.331, chapter 6.3.2.

In one embodiment, the uplink physical-layer random access channel is a Physical Random Access Channel (PRACH).

In one embodiment, the uplink physical-layer random access channel is a Narrowband Physical Random Access Channel (NPRACH).

In one embodiment, the uplink physical-layer random access channel transmission is a Non-contention-based uplink physical-layer random access channel transmission.

In one embodiment, the uplink physical-layer random access channel transmission is a contention-based uplink physical-layer random access channel transmission.

In one embodiment, a transmission of the first radio signal is a beam failure recovery request transmission in a beam failure recovery mechanism.

In one embodiment, one of the first index and the second index is 0.

In one embodiment, the first index and the second index are two different positive integers.

In one embodiment, the first index and the second index are respectively 0 and 1.

In one embodiment, the first index and the second index are respectively 1 and 2.

In one embodiment, the first index and the second index respectively correspond to 2 different Transmit-Receive Points (TRP).

In one subembodiment of the above embodiment, the first index and the second index are respectively used for indicating 2 different TRPS.

In one subembodiment of the above embodiment, the first index and the second index are respectively indexes of 2 different TRPs.

In one embodiment, the first index and the second index respectively correspond to the first time-frequency-resource set and the second time-frequency-resource set, and the first node monitors a downlink physical-layer control channel in a first time-frequency-resource set and a second time-frequency-resource set.

In one subembodiment of the above embodiment, the first time-frequency-resource set comprises a positive integer number of COntrol REsource SET(s) (CORESET), and the second time-frequency resource set comprises a positive integer number of CORESET(s).

In one subembodiment of the above embodiment, the first time-frequency-resource set comprises a positive integer number of search space set(s), and the second time-frequency-resource set comprises a positive integer number of search space set(s).

In one subembodiment of the above embodiment, the first time-frequency-resource set comprises a positive integer number of search space(s), and the second time-frequency-resource set comprises a positive integer number of search space(s).

In one subembodiment of the above embodiment, the first time-frequency-resource set comprises a positive integer number of downlink physical-layer control channel candidate(s), and the second time-frequency-resource set comprises a positive integer number of downlink physical-layer control channel candidate(s).

In one embodiment, the first index and the second index respectively correspond to 2 different antenna panels.

In one subembodiment of the above embodiment, the first index and the second index are respectively used for indicating 2 different antenna panels.

In one subembodiment of the above embodiment, the first index and the second index are respectively indexes of 2 different antenna panels.

In one subembodiment of the above embodiment, the 2 different antenna panels belong to transmitters of the M1 first-type reference signals and the M2 first-type reference signals.

In one subembodiment of the above embodiment, the 2 different antenna panels belong to transmitters of the N1 second-type reference signals and the N2 second-type reference signals.

In one subembodiment of the above embodiment, the 2 different antenna panels are respectively a transmitting antenna panel of the M1 first-type reference signals and a transmitting antenna panel of the M2 first-type reference signals, the 2 different antenna panels are respectively a transmitting antenna panel of the N1 second-type reference signals and a transmitting antenna panel of the N2 second-type reference signals.

In one subembodiment of the above embodiment, the 2 different antenna panels belong to the first node.

In one subembodiment of the above embodiment, the two different antenna panels are respectively a receiving antenna panel of the M1 first-type reference signals and a receiving antenna panel of the M2 first-type reference signals, the two different antenna panels are respectively a receiving antenna panel of the N1 second-type reference signals and a receiving antenna panel of the N2 second-type reference signals.

In one subembodiment of the above embodiment, the antenna panel comprises a positive integer number of antennas.

In one embodiment, the first index and the second index are respectively relevant to two reference signal sets, any of the two reference signal sets comprises a positive integer number of reference signal(s).

In one subembodiment of the above embodiment, the first index and the second index are respectively indexes of the two reference signal sets.

In one subembodiment of the above embodiment, the first index and the second index respectively indicates the two reference signal sets.

In one subembodiment of the above embodiment, any one of the two reference signal sets comprises at least one of an uplink reference signal or a downlink reference signal.

In one subembodiment of the above embodiment, any one of the two reference signal sets comprises an uplink reference signal.

In one subembodiment of the above embodiment, any of the two reference signal sets is a Sounding Reference Signal Resource Set.

In one subembodiment of the above embodiment, any of the two reference signal sets comprises an SRS.

In one subembodiment of the above embodiment, any of the 2 reference signal sets comprises at least one of an SRS, a CSI-RS or a SS/PBCH block.

In one subembodiment of the above embodiment, any of the 2 reference signal sets comprises at least one of a CSI-RS or a SS/PBCH block.

In one subembodiment of the above embodiment, any of the 2 reference signal sets comprises at least one of an SRS, a CSI-RS or a synchronization signal.

In one subembodiment of the above embodiment, any of the 2 reference signal sets comprises at least one of a CSI-RS or a synchronization signal.

In one subembodiment of the above embodiment, the M1 first-type reference signals and the M2 first-type reference signals respectively belong to the two reference signal sets.

In one subembodiment of the above embodiment, the N1 second-type reference signals and the N2 second-type reference signals respectively belong to the 2 reference signal sets.

In one subembodiment of the above embodiment, a spatial-domain parameter group corresponding to the M1 first-type reference signals and a spatial-domain parameter group corresponding to the M2 first-type reference signals respectively belong to a spatial-domain parameter group corresponding to the two reference signal sets.

In one subembodiment of the above embodiment, a spatial-domain parameter group corresponding to the N1 second-type reference signals and a spatial-domain parameter group corresponding to the N2 second-type reference signals respectively belong to spatial-domain parameter groups corresponding to the two reference signal sets.

In one subembodiment of the above embodiment, spatial-domain parameter groups corresponding to the two reference signal sets are respectively formed by two antenna panels, a spatial-domain parameter group corresponding to the M1 first-type reference signals and a spatial-domain parameter group corresponding to the M2 first-type reference signals are respectively formed by the two antenna panels, and a spatial-domain parameter group corresponding to the N1 reference signals and a spatial-domain parameter group corresponding to the N2 second-type reference signals are respectively formed by the two antenna panels.

In one subembodiment of the above embodiment, the spatial-domain parameter group comprises at least one of a multi-antenna relevant transmission or a multi-antenna relevant reception.

In one subembodiment of the above embodiment, the spatial-domain parameter group comprises a multi-antenna relevant transmission.

In one subembodiment of the above embodiment, the spatial-domain parameter group comprises a multi-antenna relevant reception.

In one embodiment, the first index corresponds to the M1 first-type reference signals, and the second index corresponds to the M2 first-type reference signals.

In one embodiment, the first index is used for indicating the M1 first-type reference signals, and the second index is used for indicating the M2 first-type reference signals.

In one embodiment, the first index explicitly indicates the M1 first-type reference signals, and the second index explicitly indicates the M2 first-type reference signals.

In one embodiment, the first index implicitly indicates the M1 first-type reference signals, and the second index implicitly indicates the M2 first-type reference signals.

In one embodiment, the first index is used for determining a spatial-domain parameter group corresponding to the M1 first-type reference signals, and the second index is used for determining a spatial-domain parameter group corresponding to the M2 first-type reference signals.

In one subembodiment of the above embodiment, the first index and the second index are respectively used for determining two spatial-domain parameter groups, and the two spatial-domain parameter groups respectively comprise a spatial-domain parameter group corresponding to the M1 first-type reference signals and a spatial-domain parameter group corresponding to the M2 first-type reference signals.

In one subembodiment of the above embodiment, the first index and the second index respectively correspond to two antenna panels, and a spatial-domain parameter group corresponding to the M1 first-type reference signals and a spatial-domain parameter group corresponding to the M2 first-type reference signals are respectively formed by the two antenna panels.

In one subembodiment of the above embodiment, the spatial-domain parameter group corresponding to the M1 first-type reference signals comprises at least one of a multi-antenna relevant transmission and a multi-relevant reception, and the spatial-domain parameter group corresponding to the M2 first-type reference signals comprises at least one of a multi-antenna relevant transmission and a multi-antenna relevant reception.

In one subembodiment of the above embodiment, the spatial-domain parameter group corresponding to the M1 first-type reference signals comprises a multi-antenna relevant transmission.

In one subembodiment of the above embodiment, the spatial-domain parameter group corresponding to the M1 first-type reference signals comprises a multi-antenna relevant reception.

In one subembodiment of the above embodiment, the spatial-domain parameter group corresponding to the M2 first-type reference signals comprises a multi-antenna relevant transmission.

In one subembodiment of the above embodiment, the spatial-domain parameter group corresponding to the M2 first-type reference signals comprises a multi-antenna relevant reception.

In one embodiment, the multi-antenna relevant reception is a Transmission Configuration Indicator (TCI).

In one embodiment, the multi-antenna relevant reception is a multi-antenna relevant Quasi co-location (QCL) parameter.

In one embodiment, the multi-antenna relevant reception refers to Spatial Rx parameters.

In one embodiment, the multi-antenna relevant reception refers to a receiving beam.

In one embodiment, the multi-antenna relevant reception refers to a receiving beamforming matrix.

In one embodiment, the multi-antenna relevant reception refers to a receiving analog beamforming matrix.

In one embodiment, the multi-antenna relevant reception refers to a receiving analog beamforming vector.

In one embodiment, the multi-antenna relevant reception refers to a receiving beamforming vector.

In one embodiment, the multi-antenna relevant reception is a Spatial domain reception filter.

In one embodiment, the multi-antenna relevant reception is a Spatial domain filter.

In one embodiment, the Spatial Rx parameters include one or more of a receiving beam, a receiving analog beamforming matrix, a receiving analog beamforming vector, a receiving beamforming matrix, a receiving beamforming vector a spatial-domain filter and a spatial-domain reception filter.

In one embodiment, the multi-antenna relevant transmission is a Transmission Configuration Indicator (TCI).

In one embodiment, the multi-antenna relevant transmission is a multi-antenna relevant Quasi co-location (QCL) parameter.

In one embodiment, the multi-antenna relevant transmission refers to Spatial Tx parameters.

In one embodiment, the multi-antenna relevant transmission refers to a transmitting beam.

In one embodiment, the multi-antenna relevant transmission refers to a transmitting beamforming matrix.

In one embodiment, the multi-antenna relevant transmission refers to a transmitting analog beamforming matrix.

In one embodiment, the multi-antenna relevant transmission refers to a transmitting analog beamforming vector.

In one embodiment, the multi-antenna relevant transmission refers to a transmitting beamforming vector.

In one embodiment, the multi-antenna relevant transmission is a Spatial domain filter.

In one embodiment, the multi-antenna relevant transmission is a Spatial domain transmission filter.

In one embodiment, the Spatial Tx parameters include one or more of a transmitting antenna port, a transmitting antenna port group, a transmitting beam, a transmitting analog beamforming matrix, a transmitting analog beamforming vector, a transmitting beamforming matrix, a transmitting beamforming vector, a spatial-domain filter and a spatial-domain transmitting filter.

In one embodiment, the multi-antenna relevant QCL parameters comprise: Spatial Rx parameters.

In one embodiment, the multi-antenna relevant QCL parameters comprise: one or more of an angle of arrival, an angle of departure, a spatial correlation, a multi-antenna relevant transmission and a multi-antenna relevant reception.

In one embodiment, the first index is used for determining a multi-antenna relevant transmission of the first radio resource, and the second index is used for determining a multi-antenna relevant transmission of the second radio resource.

In one embodiment, the first index is used for determining a multi-antenna relevant reception of the first radio resource, and the second index is used for determining a multi-antenna relevant reception of the second radio resource.

In one embodiment, the first threshold is the same as the second threshold.

In one embodiment, the first threshold is different from the second threshold.

In one embodiment, the first threshold and the second threshold are configured independently.

In one embodiment, a threshold corresponding to the first radio-link quality is the first threshold, and a threshold corresponding to the second radio-link quality is the second threshold.

In one embodiment, the first radio-link quality is worse than the first threshold, and the second radio-link quality is not worse than the second threshold.

In one embodiment, the first radio-link quality is not worse than the first threshold, and the second radio-link quality is worse than the second threshold.

In one embodiment, the first radio-link quality is worse than the first threshold, and the second radio-link quality is worse than the second threshold.

In one embodiment, the first threshold is 0 and the specific definition of $Q_{out,LR}$ can be found in 3GPP TS38.213, chapter 6.

In one embodiment, the second threshold is $Q_{out,LR}$ and the specific definition of $Q_{out,LR}$ can be found in 3GPP TS38.213, chapter 6.

In one embodiment, the first threshold is configured by rlmInSyncOutOfSyncThreshold, the specific definition of the rlmInSyncOutOfSyncThreshold can be found in 3GPP TS38.213, chapter 6.

In one embodiment, the second threshold is configured by rlmInSyncOutOfSyncThreshold, the specific definition of the rlmInSyncOutOfSyncThreshold can be found in 3GPP TS38.213, chapter 6.

Embodiment 2

Figure 2:
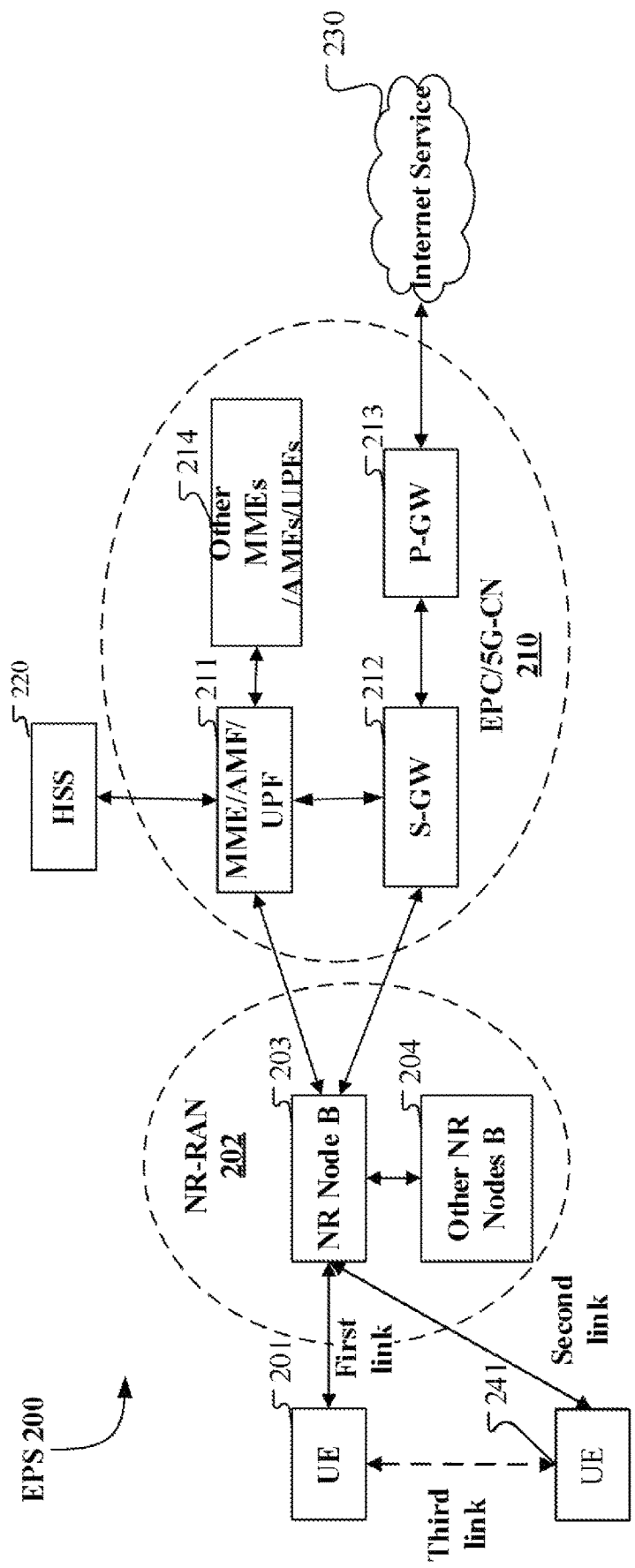
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other applicable terms. The EPS 200 may comprise one or more UEs 201, a NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrowband Internet of Things (IoT) devices, machine-type communication devices, land vehicles, automobiles, wearable devices, or any other devices having similar functions. Those skilled in the art can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
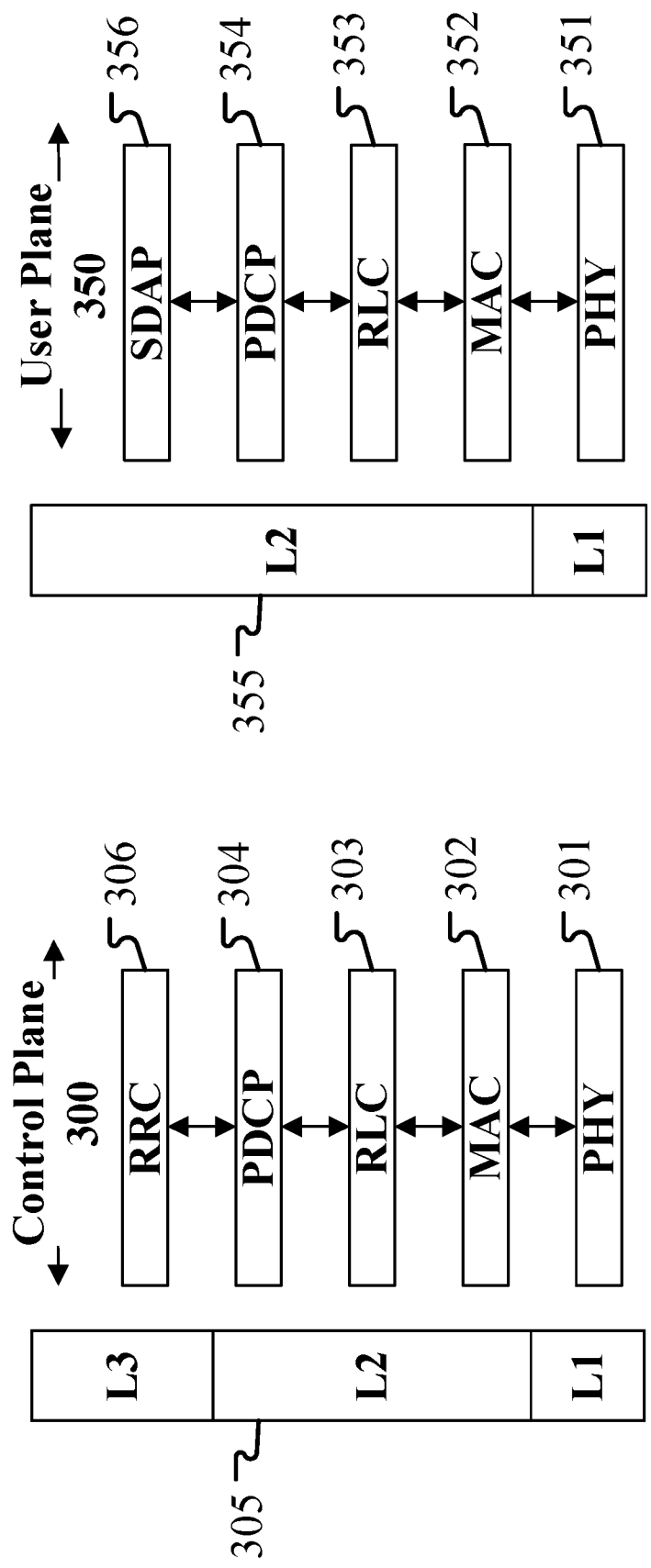
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, an RSU in gNB or V2X) and a second communication node (gNB, an RSU in UE or V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is responsible for allocating between first communication nodes various radio resources (i.e., resource block) in a cell. The MAC sublayer 302 is in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 provides a header compression for a higher-layer packet so as to reduce a radio transmission overhead. The L2 layer 355 in the user plane 350 includes Service Data Adaptation Protocol (SDAP) sublayer 356, which is responsible for the mapping between QoS flow and Data Radio Bearer (DRB) to support the diversity of traffic. Although not shown in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

In one embodiment, the fourth information in the present disclosure is generated by the RRC sublayer 306.

In one embodiment, the fourth information in the present disclosure is generated by the MAC sublayer 302.

In one embodiment, the first report in the present disclosure is generated by the RRC sublayer 306.

In one embodiment, the first report in the present disclosure is generated by the MAC sublayer 302.

In one embodiment, the first indication information in the present disclosure is generated by the RRC sublayer 306.

In one embodiment, the first indication information in the present disclosure is generated by the MAC sublayer 302.

In one embodiment, the M1 first-type reference signals in the present disclosure is generated by the PHY 301.

In one embodiment, the M2 first-type reference signals in the present disclosure is generated by the PHY 301.

In one embodiment, the N1 second-type reference signals in the present disclosure is generated by the PHY 301.

In one embodiment, the N2 second-type reference signals in the present disclosure is generated by the PHY 301.

In one embodiment, the first radio signal in the present disclosure is generated by the PHY 301.

Embodiment 4

Figure 4:
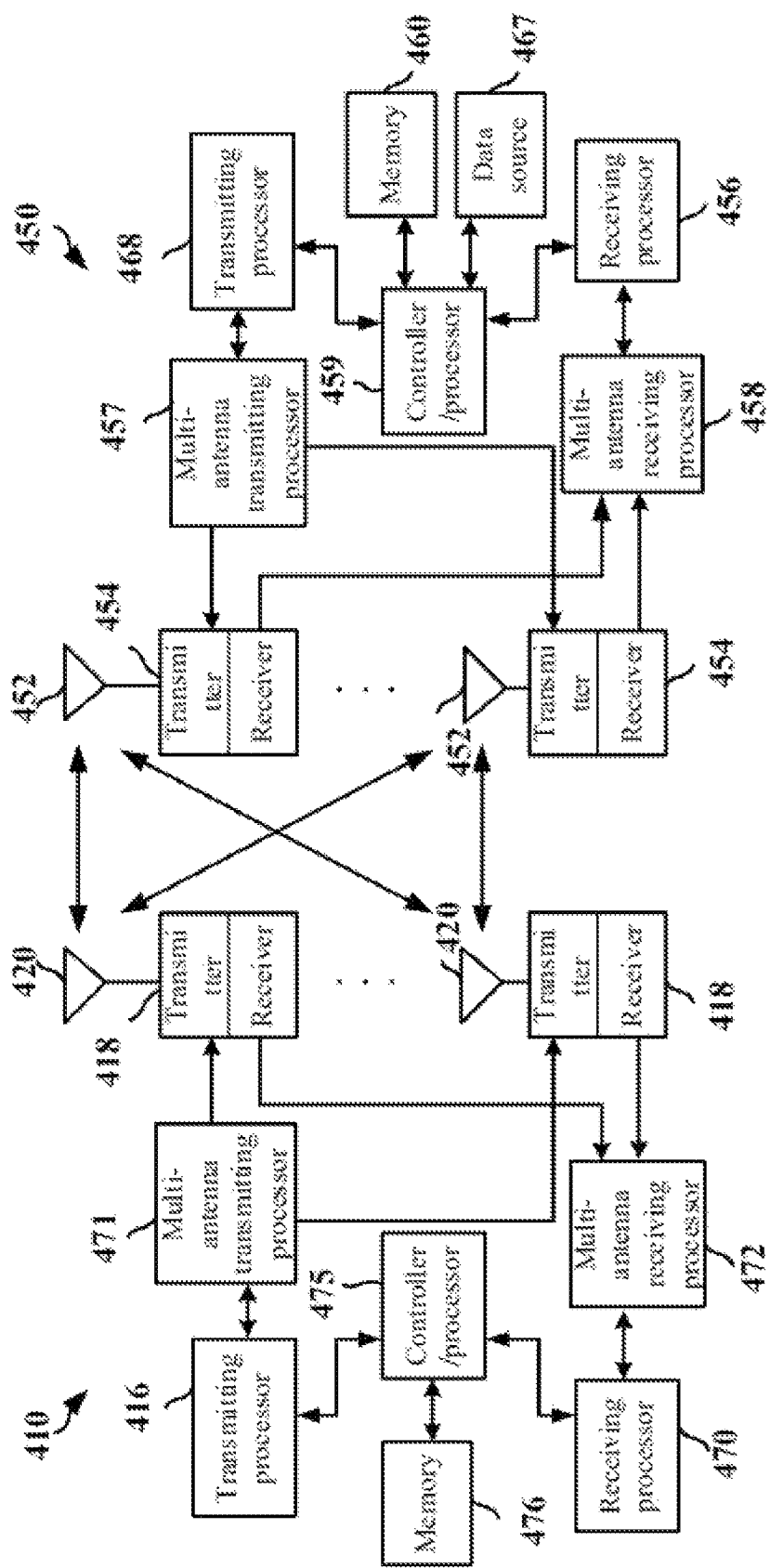
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 and a second communication device 450 that are in communication with each other in access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In the transmission from the first communication device 410 to the second communication device 450, at the first communication device 410, a higher-layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In the transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical-layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In the transmission from the second communication device to the first communication device, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for using ACK and/or NACK protocols for error detection as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives M1 first-type reference signals, measurements for the M1 first-type reference signals being used for generating first radio-link quality, M1 being a positive integer greater than 1; receives M2 first-type reference signals, measurements for the M2 first-type reference signals being used for generating second radio-link quality, M2 being a positive integer greater than 1; and transmits a first radio signal on a target radio resource; wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving M1 first-type reference signals, measurements for the M1 first-type reference signals being used for generating first radio-link quality, M1 being a positive integer greater than 1; receiving M2 first-type reference signals, measurements for the M2 first-type reference signals being used for generating second radio-link quality, M2 being a positive integer greater than 1; and transmitting a first radio signal on a target radio resource; wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits M1 first-type reference signals, measurements for the M1 first-type reference signals being used for generating first radio-link quality, M1 being a positive integer greater than 1; transmits M2 first-type reference signals, measurements for the M2 first-type reference signals being used for generating second radio-link quality, M2 being a positive integer greater than 1; and receives a first radio signal on a target radio resource; wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting M1 first-type reference signals, measurements for the M1 first-type reference signals being used for generating first radio-link quality, M1 being a positive integer greater than 1; transmitting M2 first-type reference signals, measurements for the M2 first-type reference signals being used for generating second radio-link quality, M2 being a positive integer greater than 1; and receiving a first radio signal on a target radio resource; wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource a second radio resource and a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first information in the present disclosure.

In one embodiment, at least one of the antenna 420, the transmitter 418, the multi-antenna transmitting processor 471, the transmitting processor 416, the controller/processor 475, or the memory 476 is used to transmit the first information in the present disclosure.

In one embodiment, at least one of the antenna 452, the receiver 454, the multi-antenna receiving processor 458, the receiving processor 456, the controller/processor 459, the memory 460, or the data source 467 is used to receive the second information in the present disclosure.

In one embodiment, at least one of the antenna 420, the transmitter 418, the multi-antenna transmitting processor 471, the transmitting processor 416, the controller/processor 475, or the memory 476 is used to transmit the second information in the present disclosure.

In one embodiment, at least one of the antenna 452, the receiver 454, the multi-antenna receiving processor 458, the receiving processor 456, the controller/processor 459, the memory 460, or the data source 467 is used to receive the third information in the present disclosure.

In one embodiment, at least one of the antenna 420, the transmitter 418, the multi-antenna transmitting processor 471, the transmitting processor 416, the controller/processor 475, or the memory 476 is used to transmit the third information in the present disclosure.

In one embodiment, at least one of the antenna 452, the receiver 454, the multi-antenna receiving processor 458, the receiving processor 456, the controller/processor 459, the memory 460, or the data source 467 is used to receive the fourth information in the present disclosure.

In one embodiment, at least one of the antenna 420, the transmitter 418, the multi-antenna transmitting processor 471, the transmitting processor 416, the controller/processor 475, or the memory 476 is used to transmit the fourth information in the present disclosure.

In one embodiment, at least one of the antenna 452, the receiver 454, the multi-antenna receiving processor 458, the receiving processor 456, the controller/processor 459, the memory 460, or the data source 467 is used to receive the first indication information in the present disclosure.

In one embodiment, at least one of the antenna 420, the transmitter 418, the multi-antenna transmitting processor 471, the transmitting processor 416, the controller/processor 475, or the memory 476 is used to transmit the first indication information in the present disclosure.

In one embodiment, at least one of the antenna 452, the receiver 454, the multi-antenna receiving processor 458, the receiving processor 456, the controller/processor 459, the memory 460, or the data source 467 is used to receive the M1 first-type reference signals in the present disclosure.

In one embodiment, at least one of the antenna 420, the transmitter 418, the multi-antenna transmitting processor 471, the transmitting processor 416, the controller/processor 475, or the memory 476 is used to transmit the M1 first-type reference signals in the present disclosure.

In one embodiment, at least one of the antenna 452, the receiver 454, the multi-antenna receiving processor 458, the receiving processor 456, the controller/processor 459, the memory 460, or the data source 467 is used to receive the M2 first-type reference signals in the present disclosure.

In one embodiment, at least one of the antenna 420, the transmitter 418, the multi-antenna transmitting processor 471, the transmitting processor 416, the controller/processor 475, or the memory 476 is used to transmit the M2 first-type reference signals in the present disclosure.

In one embodiment, at least one of the antenna 452, the receiver 454, the multi-antenna receiving processor 458, the receiving processor 456, the controller/processor 459, the memory 460, or the data source 467 is used to receive the N1 second-type reference signals in the present disclosure.

In one embodiment, at least one of the antenna 420, the transmitter 418, the multi-antenna transmitting processor 471, the transmitting processor 416, the controller/processor 475, or the memory 476 is used to transmit the N1 second-type reference signals in the present disclosure.

In one embodiment, at least one of the antenna 452, the receiver 454, the multi-antenna receiving processor 458, the receiving processor 456, the controller/processor 459, the memory 460, or the data source 467 is used to receive the N2 second-type reference signals in the present disclosure.

In one embodiment, at least one of the antenna 420, the transmitter 418, the multi-antenna transmitting processor 471, the transmitting processor 416, the controller/processor 475, or the memory 476 is used to transmit the N2 second-type reference signals in the present disclosure.

In one embodiment, at least one of the antenna 452, the transmitter 454, the multi-antenna transmission processor 458, the transmitting processor 468, the controller/processor 459, the memory 460, or the data sources 467 is used to transmit the first report in the present disclosure.

In one embodiment, at least one of the antenna 420, the receiver 418, the multi-antenna receiving processor 472, the receiving processor 470, the controller/processor 475, or the memory 476 is used to receive the first report in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first radio signal in the present disclosure on the target radio resource in the present disclosure.

In one embodiment, at least one of the antenna 420, the receiver 418, the multi-antenna receiving processor 472, the receiving processor 470, the controller/processor 475, or the memory 476 is used to receive the first radio signal in the present disclosure on the target radio resource in the present disclosure.

Embodiment 5

Figure 5:
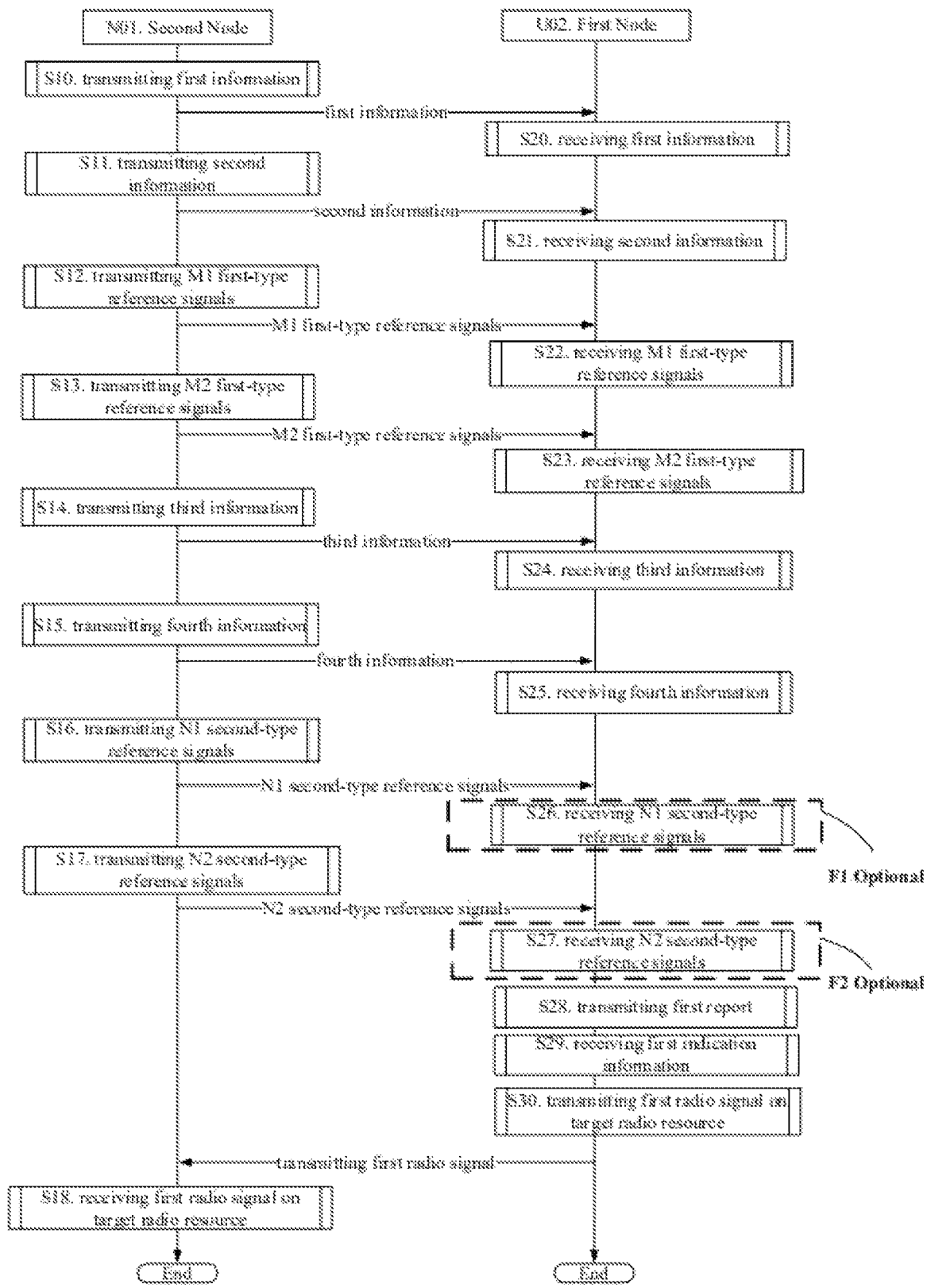
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U02 and a second node N01 communicate via an air interface. In FIG. 5, at least one of dotted blocks F1 and F2 exists.

For first node U2 receives first information in step S20; receives second information in step S21; receives M1 first-type reference signals in step S22; receives M2 first-type reference signals in step S23; receives third information in step S24; receives fourth information in step S25; receives N1 second-type reference signals in step S26; receives N2 second-type reference signals in step S27; transmits a first report in step S28; receives first indication information in step S29; transmits a first radio signal on target radio resource in step S30;

For second node N01 transmits first information in step S10; transmits second information in step S11; transmits M1 first-type reference signals in step S12; transmits M2 first-type reference signals in step S13; transmits third information in step S14; transmits fourth information in step S15; transmits N1 second-type reference signals in step S16; transmits N2 second-type reference signals in step S17; receives a first radio signal on target radio resource in step S18.

In Embodiment 5, measurements for the M1 first-type reference signals are used for generating first radio-link quality, M1 being a positive integer greater than 1; measurements for the M2 first-type reference signals are used for generating second radio-link quality, M2 being a positive integer greater than 1; the first radio-link quality and the second radio-link quality correspond to a first threshold and a second threshold respectively, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource and a third radio resource; the first radio resource and the second radio resource correspond to a first index and a second index respectively, the first index and the second index being two different nonnegative integers; the first index is used for determining the M1 first-type reference signals, and the second index is used for determining the M2 first-type reference signals. The third information is used for indicating N1 second-type reference signals; the fourth information is used for indicating N2 second-type reference signals; when the target radio resource is the second radio resource, the first node U02 receives the N1 second-type reference signals, and measurements for the N1 second-type reference signals are respectively used for generating N1 second-type measured values; when the target radio resource is the first radio resource, the first node U02 receives the N2 second-type reference signals, and measurements for the N2 second-type reference signals are respectively used for generating N2 second-type measurement values; the first index is used for determining the N1 second-type reference signals, and the second index is used for determining the N2 second-type reference signals; a target reference signal is used for generating the first radio signal; when the target radio resource is the second radio resource, the target reference signal is one of the N1 second-type reference signals; when the target radio resource is the first radio resource, the target reference signal is one of the N2 second-type reference signals; N1 is a positive integer greater than 1, and N2 is a positive integer greater than 1. The first report is used for indicating P1 second-type reference signal(s); the first indication information is used for indicating the target reference signal, the target reference signal being one of the P1 second-type reference signal(s), P1 being a positive integer; when the target radio resource is the second radio resource, size relationships respectively between the N1 second-type measured values and N1 first-type thresholds are used for determining the P1 second-type reference signal(s) out of the N1 second-type reference signals; when the target radio resource is the first radio resource, size relationships respectively between the N2 second-type measured values and N2 first-type thresholds are used for determining the P1 second-type reference signal(s) out of the N2 second-type reference signals. The second information is used for indicating the first radio resource, the second radio resource and the third radio resource. The first information is used for determining the first index and the second index.

In one embodiment, the third information is semi-statically configured.

In one embodiment, the third information is carried by a higher-layer signaling.

In one embodiment, the third information is carried by an RRC signaling.

In one embodiment, the third information comprises a positive integer number of IE(s) of an RRC signaling.

In one embodiment, the third information comprises multiple IEs of an RRC signaling.

In one embodiment, the third information comprises all or part of an IE of an RRC signaling.

In one embodiment, the third information is carried by an MAC CE signaling.

In one embodiment, the third information explicitly indicates the N1 second-type reference signals.

In one embodiment, the third information implicitly indicates the N1 second-type reference signals.

In one embodiment, the third information indicates indexes of the N1 second-type reference signals.

In one embodiment, the third information comprises configuration information of the N1 second-type reference signals.

In one embodiment, configuration information of the second-type reference signal includes at least one of a period, a time-domain offset, time-domain resources occupied, frequency-domain resources occupied, code-domain resources occupied, a cyclic shift, an Orthogonal Cover Code (OCC), antenna port group occupied, transmission sequence, a multi-antenna relevant transmission adopted and a multi-antenna relevant reception adopted.

In one subembodiment of the above embodiment, the second-type reference signal comprises a CSI-RS.

In one embodiment, configuration information of the second-type reference signal includes at least one of a period, a time-domain offset, time-domain resources occupied, frequency-domain resources occupied, code-domain resources occupied, a cyclic shift, an Orthogonal Cover Code (OCC), antenna port group occupied, leader sequence, a multi-antenna relevant transmission adopted and a multi-antenna relevant reception adopted.

In one subembodiment of the above embodiment, the second-type reference signal comprises an SS/PBCH block.

In one embodiment, the N1 second-type reference signals are used for a new candidate beam identification in beam failure recovery mechanism.

In one embodiment, the N1 second-type reference signals comprise at least one of a CSI-RS or an SS/PBCH Block.

In one embodiment, the N1 second-type reference signals comprise at least one of a periodic CSI-RS or an SS/PBCH block.

In one embodiment, the N1 second-type reference signals comprise a CSI-RS.

In one embodiment, the N1 second-type reference signals are semi-statically configured.

In one embodiment, the N1 second-type reference signals are configured by a higher-layer signaling.

In one embodiment, the N1 second-type reference signals are $\bar{q}_1$s, and the specific definition of $\bar{q}_1$ can be found in 3GPP TS38.213, chapter 6.

In one embodiment, the third information comprises a candidateBeamRSList in BeamFailureRecoveryConfig IE, and the specific definition of the BeamFailureRecoveryConfig IE and the candidateBeamRSList can be found in 3GPP TS38.213, chapter 6.

In one embodiment, the N1 is predefined.

In one embodiment, the N1 is configurable.

In one embodiment, the N1 is configured by maxNrofCandidateBeams, and the specific definition of the maxNrofCandidateBeams can be found in 3GPP TS38.331, chapter 6.3.2.

In one embodiment, the fourth information is semi-statically configured.

In one embodiment, the fourth information is carried by a higher-layer signaling.

In one embodiment, the fourth information is carried by an RRC signaling.

In one embodiment, the fourth information comprises a positive integer number of IE(s) of an RRC signaling.

In one embodiment, the fourth information comprises multiple IEs of an RRC signaling.

In one embodiment, the fourth information comprises all or part of an IE of an RRC signaling.

In one embodiment, the third information and the fourth information belong to a same IE in an RRC signaling.

In one embodiment, the third information and the fourth information respectively belong to two IEs in an RRC signaling.

In one embodiment, the fourth information is carried by an MAC CE signaling.

In one embodiment, the fourth information explicitly indicates the N2 second-type reference signals.

In one embodiment, the fourth information implicitly indicates the N2 second-type reference signals.

In one embodiment, the fourth information indicates indexes of the N2 second-type reference signals.

In one embodiment, the fourth information comprises configuration information of the N2 second-type reference signals.

In one embodiment, any two second-type reference signals among the N1 second-type reference signals and the N2 second-type reference signals are different.

In one embodiment, the N2 second-type reference signals are used for a new candidate beam identification in beam failure recovery mechanism.

In one embodiment, the N2 second-type reference signals comprise at least one of a CSI-RS or an SS/PBCH Block.

In one embodiment, the N2 second-type reference signals comprise at least one of a periodic CSI-RS or an SS/PBCH Block.

In one embodiment, the N2 second-type reference signals comprise a CSI-RS.

In one embodiment, the N2 second-type reference signals are semi-statically configured.

In one embodiment, the N2 second-type reference signals are configured by a higher-layer signaling.

In one embodiment, the N2 second-type reference signals are $\bar{q}_1$s, and the specific definition of $\bar{q}_1$ can be found in 3GPP TS38.213, chapter 6.

In one embodiment, the fourth information comprises a candidateBeamRSList in BeamFailureRecoveryConfig IE, and the specific definition of the BeamFailureRecoveryConfig IE and the candidateBeamRSList can be found in 3GPP TS38.213, chapter 6.

In one embodiment, the N2 is predefined.

In one embodiment, the N2 is configurable.

In one embodiment, the N2 is configured by maxNrofCandidateBeams, and the specific definition of the maxNrofCandidateBeams can be found in 3GPP TS38.331, chapter 6.3.2.

In one embodiment, the second-type measured value is a Reference signal received power (RSRP) value, and the second-type measured value is measured by dBm.

In one embodiment, the second-type measured value is a Reference signal received quality (RSRQ) value, and the second-type measured value is measured by dB.

In one embodiment, the first index corresponds to the N1 second-type reference signals, and the second index corresponds to the N2 second-type reference signals.

In one embodiment, the first index is used for indicating the N1 second-type reference signals, and the second index is used for indicating the N2 second-type reference signals.

In one embodiment, the first index explicitly indicates the N1 second-type reference signals, and the second index explicitly indicates the N2 second-type reference signals.

In one embodiment, the first index implicitly indicates the N1 second-type reference signals, and the second index implicitly indicates the N2 second-type reference signals.

In one embodiment, the first index is used for determining a spatial-domain parameter group corresponding to the N1 second-type reference signals, and the second index is used for determining a spatial-domain parameter group corresponding to the N2 second-type reference signals.

In one subembodiment of the above embodiment, the first index and the second index are respectively used for determining two spatial-domain parameter groups, and the two-domain parameter groups respectively comprise a spatial-domain parameter group corresponding to the N1 second-type parameter signals and a spatial-domain parameter group corresponding to the N2 second-type reference signals.

In one subembodiment of the above embodiment, the first index and the second index respectively correspond to two antenna panels, and a spatial-domain parameter group corresponding to the N1 second-type reference signals and a spatial-domain parameter group corresponding to the N2 second-type reference signals are respectively formed by the two antenna panels.

In one subembodiment of the above embodiment, the spatial-domain parameter group corresponding to the N1 second-type reference signals comprises at least one of a multi-antenna relevant transmission and a multi-relevant reception, and the spatial-domain parameter group corresponding to the N2 second-type reference signals comprises at least one of a multi-antenna relevant transmission and a multi-relevant reception.

In one subembodiment of the above embodiment, the spatial-domain parameter group corresponding to the N1 second-type reference signals comprises a multi-antenna relevant transmission.

In one subembodiment of the above embodiment, the spatial-domain parameter group corresponding to the N1 second-type reference signals comprises a multi-antenna relevant reception.

In one subembodiment of the above embodiment, the spatial-domain parameter group corresponding to the N2 second-type reference signals comprises a multi-antenna relevant transmission.

In one subembodiment of the above embodiment, the spatial-domain parameter group corresponding to the N2 second-type reference signals comprises a multi-antenna relevant reception.

In one embodiment, the second radio resource is reserved for the N1 second-type reference signals, and the first radio resource is reserved for the N2 second-type reference signals.

In one embodiment, the first report is transferred inside the first node from a physical layer to a higher layer.

In one embodiment, the first report explicitly indicates P1 second-type reference signal(s).

In one embodiment, the first report implicitly indicates P1 second-type reference signal(s).

In one embodiment, the first report comprises index(es) of P1 second-type reference signal(s).

In one embodiment, the first report is used for indicating P1 second-type reference signal(s) and P1 second-type measured value(s), and the P1 second-type measured value(s) is(are) respectively generated for a measurement (measurements) of the P1 second-type reference signal(s).

In one embodiment, the first report explicitly indicates P1 second-type reference signal(s) and P1 second-type measured value(s).

In one embodiment, the first report implicitly indicates P1 second-type reference signal(s) and P1 second-type measured value(s).

In one embodiment, the first report comprises index(es) of P1 second-type reference signal(s) and P1 second-type measured value(s).

In one embodiment, the first indication information is transferred inside the first node from a higher layer to a physical layer.

In one embodiment, the first indication information explicitly indicates the target reference signal.

In one embodiment, the first indication information implicitly indicates the target reference signal.

In one embodiment, the first indication information indicates an index of the target reference signal.

In one embodiment, the first indication information indicates an index of the target reference signal in the P1 second-type reference signal(s).

In one embodiment, the target reference signal is $q_{new}$, and the specific definition of $q_{new}$ can be found in 3GPP TS38.213, chapter 6.

In one embodiment, the first node maintains a first counter, when a value of the first counter reaches a third threshold, the first information is transmitted; a value of the first counter indicates times of beam failure instance.

In one subembodiment of the above embodiment, the first counter is BFI_COUNTER, the third threshold is beamFailureInstanceMaxCount, and the specific definitions of the BFI_COUNTER and the beamFailureInstanceMaxCount can be found in 3GPP TS38.321, chapter 5.17.

In one embodiment, the second information is semi-statically configured.

In one embodiment, the second information is carried by a higher-layer signaling.

In one embodiment, the second information is carried by an MAC CE signaling.

In one embodiment, the second information comprises a positive integer number of IE(s) of an RRC signaling.

In one embodiment, the second information comprises multiple IEs of an RRC signaling.

In one embodiment, the second information comprises all or part of an IE of an RRC signaling.

In one embodiment, the second information is carried by an MAC CE signaling.

In one embodiment, the second information and the third information belong to a same IE in an RRC signaling.

In one embodiment, the second information and the third information respectively belong to different IEs in an RRC signaling.

In one embodiment, the second information is used for indicating that the first index corresponds to the first radio resource, and the second index corresponds to the second radio resource.

In one embodiment, the second information explicitly indicates that the first index corresponds to the first radio resource, and the second index corresponds to the second radio resource.

In one embodiment, the second information implicitly indicates that the first index corresponds to the first radio resource, and the second index corresponds to the second radio resource.

In one embodiment, the second information explicitly indicates the first radio resource, the second radio resource and the third radio resource.

In one embodiment, the second information implicitly indicates the first radio resource, the second radio resource and the third radio resource.

In one embodiment, the second information indicates an index of the first radio resource, an index of the second radio resource and an index of the third radio resource.

In one embodiment, the second information comprises PRACH-ResourceDedicatedBFR in BeamFailureRecoveryConfig IE, and the specific definition of the BeamFailureRecoveryConfig IE and the PRACH-ResourceDedicatedBFR can be found in 3GPP TS38.213, chapter 6.

In one embodiment, the first information is semi-statically configured.

In one embodiment, the first information is carried by a higher-layer signaling.

In one embodiment, the first information is carried by an RRC signaling.

In one embodiment, the first information is carried by an MAC CE signaling.

In one embodiment, the first information comprises one or more IEs of an RRC signaling.

In one embodiment, the first information comprises all or part of an IE of an RRC signaling.

In one embodiment, the first information comprises part of fields of an IE in an RRC signaling.

In one embodiment, the first information comprises multiple IEs of an RRC signaling.

In one embodiment, the first information is transmitted on a downlink physical data channel (i.e., a downlink channel that can be used for bearing physical-layer data).

In one embodiment, the first information is used for indicating the first index and the second index.

In one embodiment, the first information explicitly indicates the first index and the second index.

In one embodiment, the first information implicitly indicates the first index and the second index.

In one embodiment, the first information indicates the K, the K being used for determining the first index and the second index.

In one embodiment, the first information indicates the K, and the first index and the second index are respectively 0 and 1.

In one embodiment, the first information indicates the K, and the first index and the second index are respectively 1 and 2.

Embodiment 6

Figure 6:
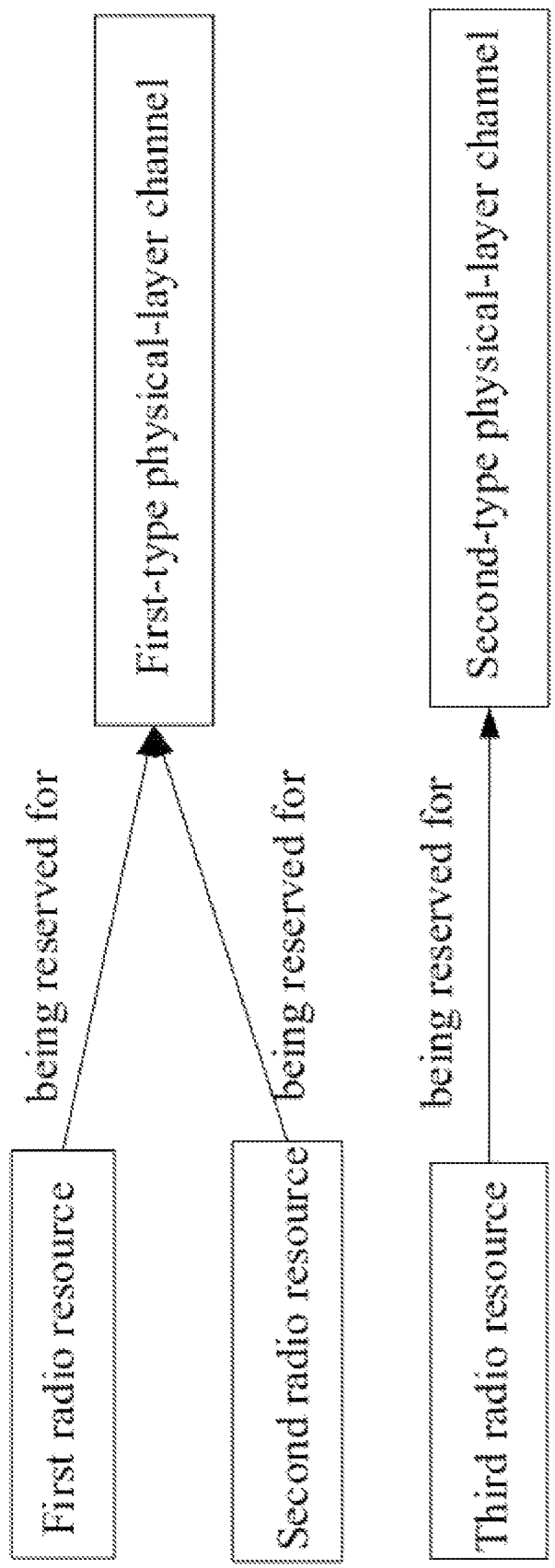
FIG. 6 illustrates a schematic diagram of a first radio resource, a second radio resource and a third radio resource according to one embodiment of the present disclosure.

Embodiment 6 illustrates a schematic diagram of first radio resource, second radio resource and third radio resource according to one embodiment of the present disclosure, as shown in FIG. 6.

In Embodiment 6, the first radio resource and the second radio resource are both reserved for a first-type physical-layer channel, and the third radio resource is reserved for a second-type physical-layer channel, the first-type physical-layer channel and the second-type physical-layer channel being different.

In one embodiment, the first-type physical-layer channel is an uplink physical-layer control channel.

In one embodiment, types of the first-type physical channel and the second-type physical channel are different.

In one embodiment, the second-type physical-layer channel is an uplink physical-layer random access channel.

In one embodiment, the second-type physical-layer channel is a Physical Random Access Channel (PRACH).

In one embodiment, the second-type physical-layer channel is a Narrowband Physical Random Access Channel (NPRACH).

In one embodiment, the second-type physical-layer channel transmission is a Non-contention-based uplink physical-layer random access channel transmission.

In one embodiment, the second-type physical-layer channel transmission is a contention-based uplink physical-layer random access channel transmission.

Embodiment 7

Figure 7:
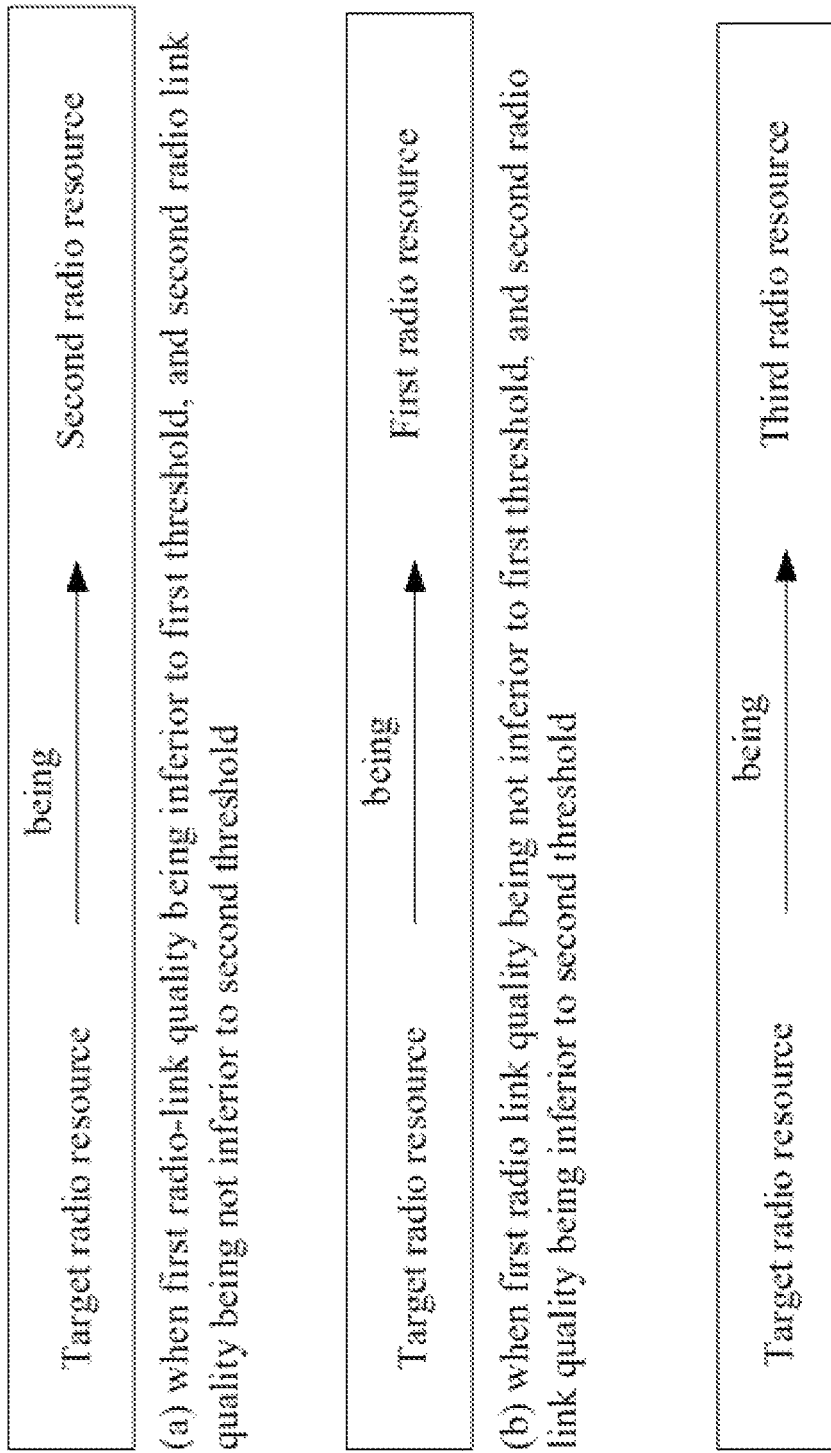
FIG. 7 illustrates a schematic diagram of determining a target radio resource according to one embodiment of the present disclosure.

Embodiment 7 illustrates a schematic diagram of determining a target radio resource according to one embodiment of the present disclosure, as shown in FIG. 7.

In Embodiment 7, when the first radio-link quality in the present disclosure is worse than the first threshold in the present disclosure and the second radio-link quality in the present disclosure is not worse than the second threshold in the present disclosure, the target radio resource is the second radio resource in the present disclosure; when the first radio-link quality is not worse than the first threshold and the second radio-link quality is worse than the second threshold, the target radio resource is the first radio resource in the present disclosure; when the first radio-link quality is worse than the first threshold and the second radio-link quality is worse than the second threshold, the target radio resource is the third radio resource in the present disclosure;

In one embodiment, the first radio-link quality comprises a first-type measured value, and the second radio-link quality comprises a first-type measured value; the phrase that the first radio-link quality is worse than the first threshold refers to that a first-type measured value comprised in the first radio-link quality is greater than the first threshold, and the phrase that the first radio-link quality is not worse than the first threshold refers to that a first-type measured value comprised in the first radio-link quality is less than the first threshold; the phrase that the second radio-link quality is worse than the second threshold refers to that a first-type measured value comprised in the second radio-link quality is greater than the second threshold, and the phrase that the second radio-link quality is not worse than the second threshold refers to that a first-type measured value comprised in the second radio-link quality is less than the second threshold.

In one subembodiment of the above embodiment, the first-type measured value is a BLock Error Rate (BLER) value, and the first threshold and the second threshold are both positive real numbers less than 1.

In one embodiment, the first radio-link quality comprises a first-type measured value, and the second radio-link quality comprises a first-type measured value; the phrase that the first radio-link quality is worse than the first threshold refers to that a first-type measured value comprised in the first radio-link quality is less than the first threshold, and the phrase that the first radio-link quality is not worse than the first threshold refers to that a first-type measured value comprised in the first radio-link quality is greater than the first threshold; the phrase that the second radio-link quality is worse than the second threshold refers to that a first-type measured value comprised in the second radio-link quality is less than the second threshold, and the phrase that the second radio-link quality is not worse than the second threshold refers to that a first-type measured value comprised in the second radio-link quality is greater than the second threshold.

In one subembodiment of the above embodiment, the first-type measured value is a Reference signal received power (RSRP) value, the first-type measured value is measured by dBm, and the first threshold and the second threshold are both measured by dBm.

In one subembodiment of the above embodiment, the first threshold and the second threshold are both real numbers.

In one subembodiment of the above embodiment, the first-type measured value is a Reference signal received quality (RSRQ) value, the first-type measured value is measured by dB, and the first threshold and the second threshold are both measured by dB.

In one embodiment, the phrase that the first radio-link quality is worse than the first threshold refers to that each first-type measured value comprised in the first radio-link quality is greater than the first threshold, and the phrase that the first radio-link quality is not worse than the first threshold refers to that at least one first-type measured value comprised in the first radio-link quality is less than the first threshold; the phrase that the second radio-link quality is worse than the second threshold refers to that each first-type measured value comprised in the second radio-link quality is greater than the second threshold, and the phrase that the second radio-link quality is not worse than the second threshold refers to that at least one first-type measured value comprised in the second radio-link quality is less than the second threshold.

In one subembodiment of the above embodiment, the first-type measured value is a BLER value, and the first threshold and the second threshold are both positive real numbers less than 1.

In one embodiment, the phrase that the first radio-link quality is worse than the first threshold refers to that each first-type measured value comprised in the first radio-link quality is less than the first threshold, and the phrase that the first radio-link quality is not worse than the first threshold refers to that at least one first-type measured value comprised in the first radio-link quality is greater than the first threshold; the phrase that the second radio-link quality is worse than the second threshold refers to that each first-type measured value comprised in the second radio-link quality is less than the second threshold, and the phrase that the second radio-link quality is not worse than the second threshold refers to that at least one first-type measured value comprised in the second radio-link quality is greater than the second threshold.

In one subembodiment of the above embodiment, the first-type measured value is a Reference signal received power (RSRP) value, the first-type measured value is measured by dBm, and the first threshold and the second threshold are both measured by dBm.

In one subembodiment of the above embodiment, the first threshold is a real number, and the second threshold is a real number.

In one subembodiment of the above embodiment, the first-type measured value is a Reference signal received quality (RSRQ) value, the first-type measured value is measured by dB, and the first threshold and the second threshold are both measured by dB.

Embodiment 8

Figure 8:
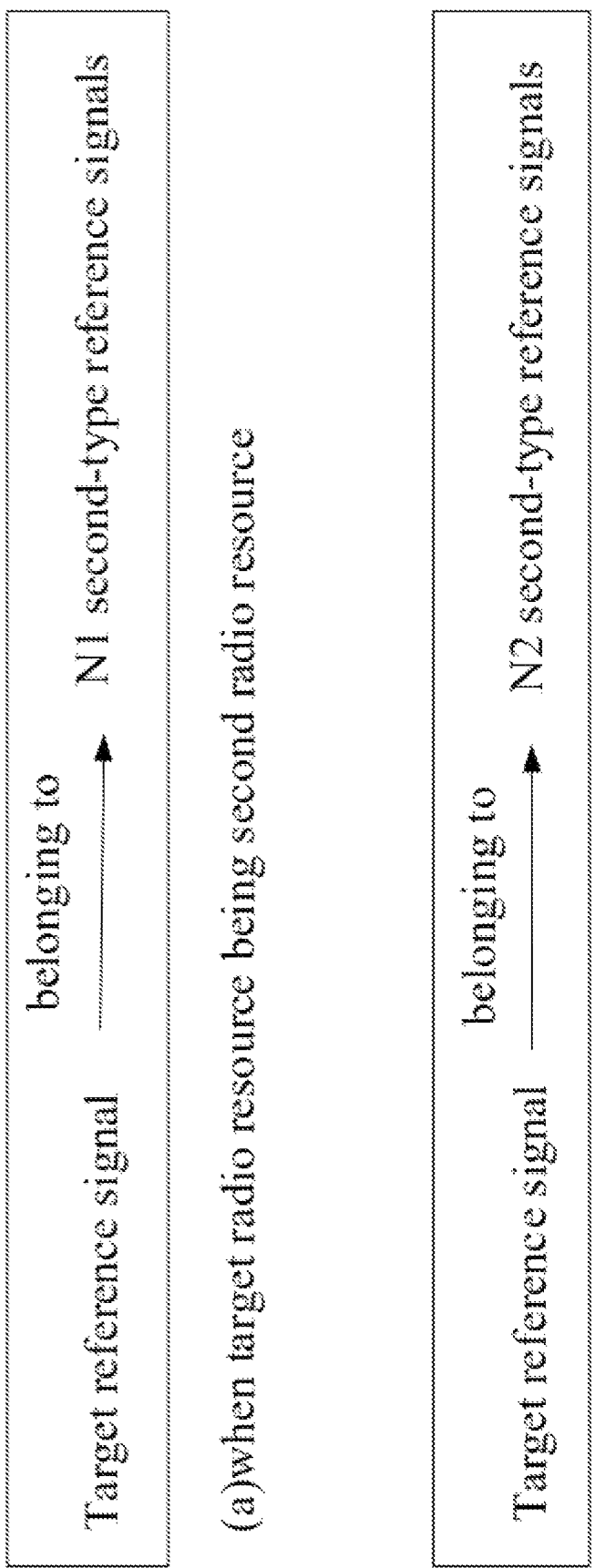
FIG. 8 illustrates a schematic diagram of determining a target reference signal according to one embodiment of the present disclosure.

Embodiment 8 illustrates a schematic diagram of determining a target reference signal according one embodiment of the present disclosure, as shown in FIG. 8.

In Embodiment 8, when the target radio resource in the present disclosure is the second radio resource in the present disclosure, the target reference signal is one of the N1 second-type reference signals in the present disclosure; when the target radio resource is the first radio resource in the present disclosure, the target reference signal is one of the N2 second-type reference signals in the present disclosure.

In one embodiment, the above method comprises:

when the target radio resource is the third radio resource, receiving the N1 second-type reference signals and the N2 second-type reference signals, and measurements for the N1 second-type reference signals are respectively used for generating the N1 second-type measured values, and measurements for the N2 second-type reference signals are respectively used for generating the N2 second-type measured values.

Herein, when the target radio resource is the third radio resource, the target reference signal is one second-type reference signal among the N1 second-type reference signals and the N2 second-type reference signals.

In one embodiment, the first radio signal is used for indicating the target reference signal.

In one embodiment, the first radio signal explicitly indicates the target reference signal.

In one embodiment, the first radio signal implicitly indicates the target reference signal.

Embodiment 9

Figure 9:
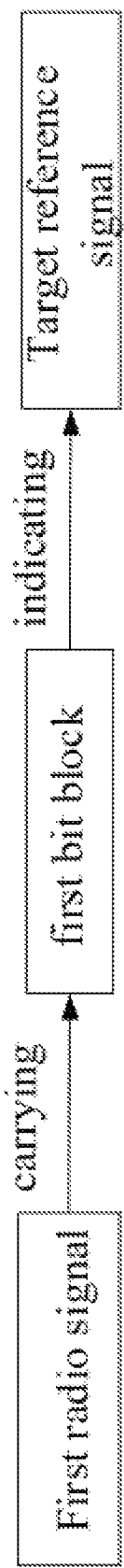
FIG. 9 illustrates a schematic diagram of a target reference signal being used for generating the first radio signal according to one embodiment of the present disclosure.

Embodiment 9 illustrates a schematic diagram of a target reference signal being used for generating the first radio signal according to one embodiment of the present disclosure, as shown in FIG. 9.

In Embodiment 9, the target radio resource in the present disclosure is the first radio resource in the present disclosure or the second radio resource in the present disclosure; the first radio signal carries a first bit block, the first bit block being used for indicating the target reference signal, the first bit block comprising a positive integer number of bit(s).

In one embodiment, the target radio resource is the second radio resource, the target reference signal is one of the N1 second-type reference signals, and the first bit block is used for indicating the target reference signal.

In one embodiment, the target radio resource is the first radio resource, the target reference signal is one of the N2 second-type reference signals, and the first bit block is used for indicating the target reference signal.

In one embodiment, the first bit block comprises Uplink Control Information (UCI).

In one embodiment, the first bit block explicitly indicates the target reference signal.

In one embodiment, the first bit block implicitly indicates the target reference signal.

In one embodiment, the first bit block comprises an index of the target reference signal.

In one embodiment, the target radio resource is the second radio resource, and the first bit block comprises an index of the target reference signal in the N1 second-type reference signals.

In one embodiment, the target radio resource is the first radio resource, and the first bit block comprises an index of the target reference signal in the N2 second-type reference signals.

In one embodiment, a given radio signal carries a given bit block.

In one subembodiment of the above embodiment, the given bit block is used for generating the given radio signal.

In one subembodiment of the above embodiment, the given radio signal is obtained by the given bit block sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one subembodiment of the above embodiment, the given radio signal is obtained by the given bit block sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation and Modulation and Upconversion.

In one subembodiment of the above embodiment, the given radio signal is obtained by the given bit block sequentially subjected to CRC Insertion, Segmentation, CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

Embodiment 10

Figure 10:
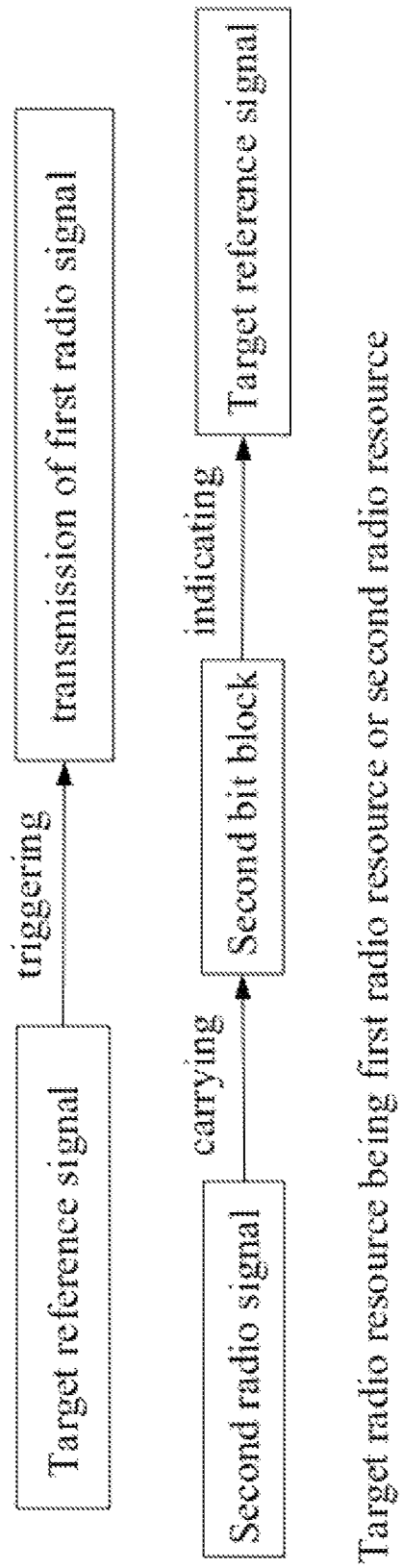
FIG. 10 illustrates a schematic diagram of a target reference signal being used for generating the first radio signal according to another embodiment of the present disclosure.

Embodiment 10 illustrates a schematic diagram of a target reference signal being used for generating the first radio signal according to another embodiment of the present disclosure, as shown in FIG. 10.

In Embodiment 10, the target radio resource in the present disclosure is the first radio resource in the present disclosure or the second radio resource in the present disclosure; the first node in the present disclosure receives fifth information and transmits a second radio signal; herein, the target reference signal is used for triggering transmission of the first radio signal; the first radio signal is used for requesting transmission of the fifth information, the fifth information being used for indicating time-frequency resources occupied by the second radio signal; the second radio signal carries a second bit block, the second bit block is used for indicating the target reference signal; a transmission time of the fifth information is later than a transmission time of the first radio signal, and a transmission time of the second radio signal is later than a transmission time of the fifth information; and the second bit block comprises a positive integer number of bit(s).

In one embodiment, the second radio signal is transmitted on an uplink physical-layer data channel (i.e., an uplink channel can be used for carrying physical layer data).

In one embodiment, the uplink physical layer data channel is a Physical Uplink Shared CHannel (PUSCH).

In one subembodiment, the uplink physical layer data channel is a short PUSCH (sPUSCH).

In one embodiment, the uplink physical layer data channel is a Narrow Band PUSCH (NB-PUSCH).

In one embodiment, the first radio signal carries a third bit block, the third bit block comprising a Scheduling Request (SR), and the SR comprised in the third bit block is used for requesting the transmission of the fifth information.

In one subembodiment of the above embodiment, the third bit block comprises a bit.

In one subembodiment of the above embodiment, the third bit block comprises a positive integer number of bit(s).

In one embodiment, the fifth information is carried by a physical-layer signaling.

In one embodiment, the fifth information is carried by a DCI signaling.

In one embodiment, the fifth information is transferred on a downlink physical-layer control channel.

In one embodiment, the target radio resource is the second radio resource, the target reference signal is one of the N1 second-type reference signals, and the second bit block is used for indicating the target reference signal.

In one embodiment, the target radio resource is the first radio resource, the target reference signal is one of the N2 second-type reference signals, and the second bit block is used for indicating the target reference signal.

In one embodiment, the second bit block comprises Uplink Control Information (UCI).

In one embodiment, the second bit block explicitly indicates the target reference signal.

In one embodiment, the second bit block implicitly indicates the target reference signal.

In one embodiment, the second bit block comprises an index of the target reference signal.

In one embodiment, the target radio resource is the second radio resource, and the second bit block comprises an index of the target reference signal in the N1 second-type reference signals.

In one embodiment, the target radio resource is the first radio resource, and the second bit block comprises an index of the target reference signal in the N2 second-type reference signals.

Embodiment 11

Figure 11:
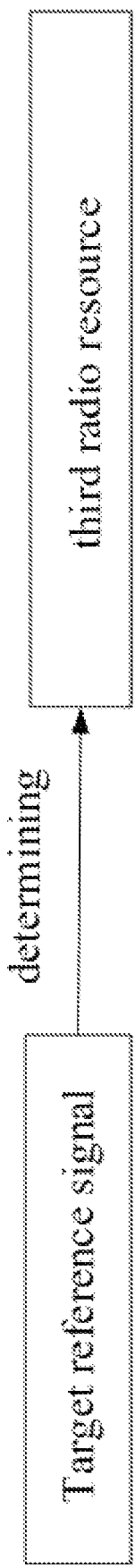
FIG. 11 illustrates a schematic diagram of a target reference signal being used for generating the first radio signal according to another embodiment of the present disclosure.

Embodiment 11 illustrates a schematic diagram of a target reference signal being used for generating the first radio signal according to another embodiment of the present disclosure, as shown in FIG. 11.

In Embodiment 11, the target radio resource in the present disclosure is the third radio resource in the present disclosure, the first radio signal is transmitted on the third radio resource, and the target reference signal is used for determining the third radio resource.

In one embodiment, the third radio resource is used for indicating the target reference signal.

In one embodiment, the first radio signal is a preamble of an uplink physical-layer random access channel.

In one embodiment, N1 radio resources respectively correspond to the N1 second-type reference signals, N2 radio resources respectively correspond to the N2 second-type reference signals, and the third radio resource is an radio resource corresponding to the target reference signal among the N1 radio resources and the N2 radio resources.

In one subembodiment of the above embodiment, any two radio resources among the N1 radio resources and the N2 radio resources are different.

In one subembodiment of the above embodiment, any two radio resources among the N1 radio resources and the N2 radio resources are orthogonal.

Embodiment 12

Figure 12:
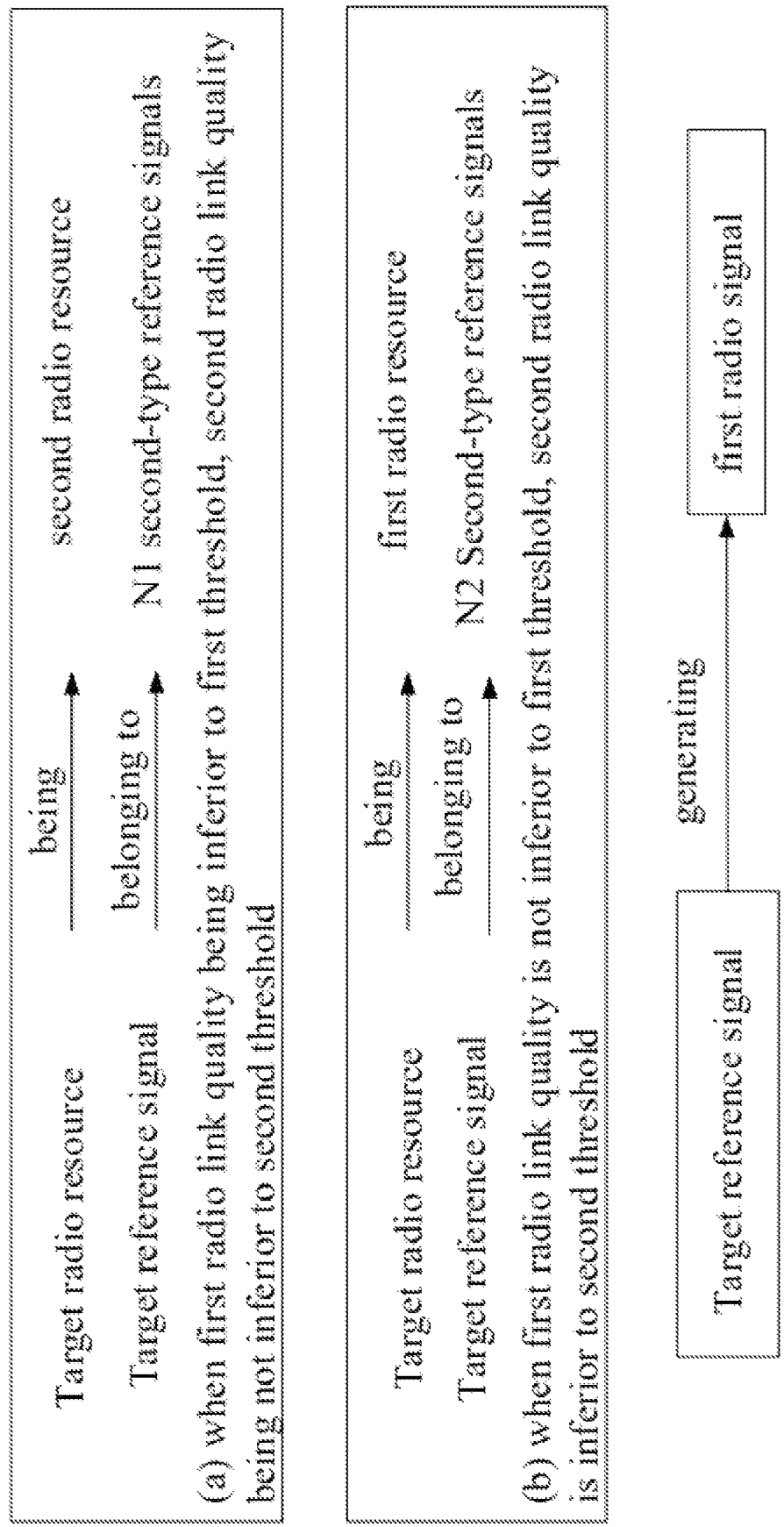
FIG. 12 illustrates a schematic diagram of first radio-link quality and second radio-link quality being used for determining a target radio resource and a first radio signal according to one embodiment of the present disclosure.

Embodiment 12 illustrates a schematic diagram of first radio-link quality and second radio-link quality being used for determining a target radio resource and a first radio signal according to one embodiment of the present disclosure, as shown in FIG. 12.

In Embodiment 12, when the first radio-link quality is worse than the first threshold in the present disclosure and the second radio-link quality is not worse than the second threshold in the present disclosure, the target radio resource is the second radio resource in the present disclosure, and a target reference signal is one of the N1 second-type reference signals in the present disclosure; when the first radio-link quality is not worse than the first threshold and the second radio-link quality is worse than the second threshold, the target radio resource is the first radio resource in the present disclosure, and a target reference signal is one of the N2 second-type reference signals; the target reference signal is used for generating the first radio signal.

In one embodiment, when the first radio-link quality is worse than the first threshold and the second radio-link quality is worse than the second threshold, the target radio resource is the third radio resource, and the target reference signal is one second-type reference signal among the N1 second-type reference signals and the N2 second-type reference signals.

Embodiment 13

Figure 13:
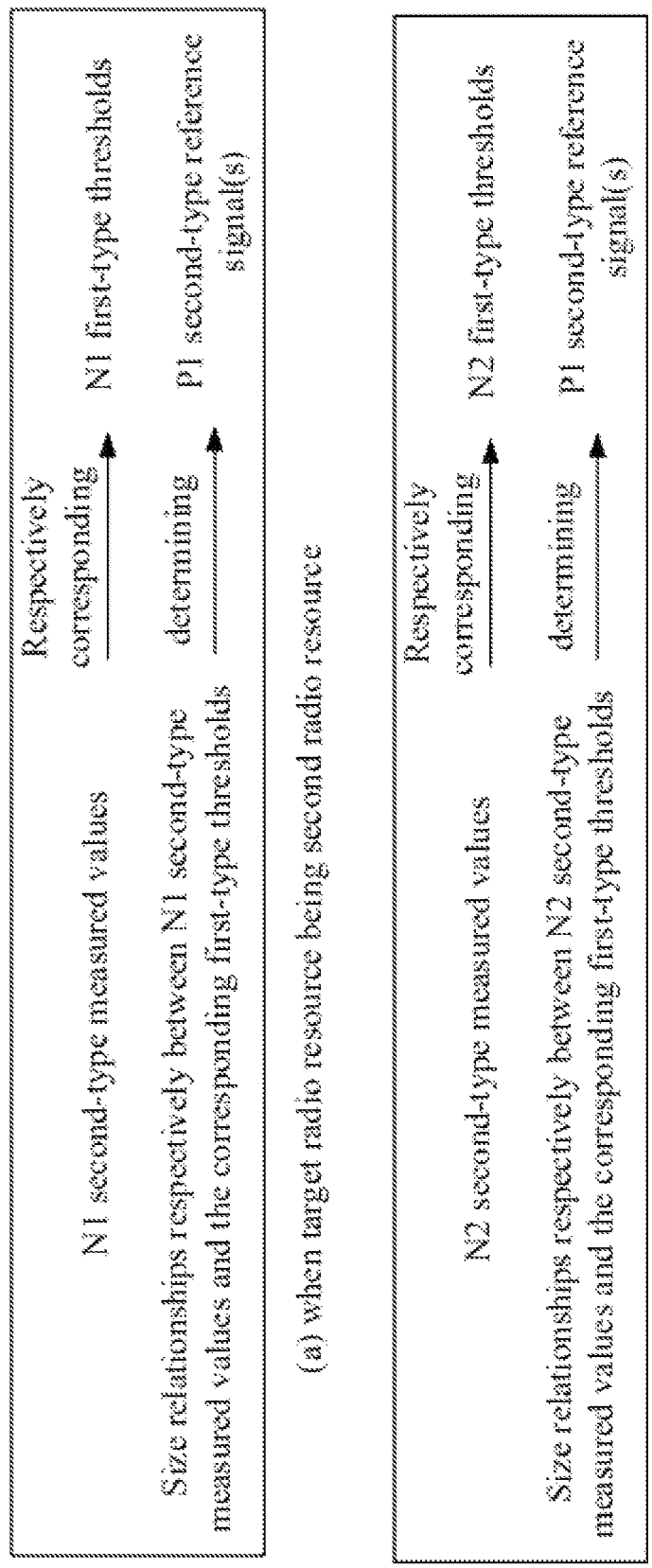
FIG. 13 illustrates a schematic diagram of determining P1 second-type reference signal(s) according to another embodiment of the present disclosure.

Embodiment 13 illustrates a schematic diagram of determining P1 second-type reference signal(s) according to one embodiment of the present disclosure, as shown in FIG. 13.

In Embodiment 13, the N1 second-type measured values in the present disclosure respectively correspond to N1 first-type thresholds, and the N2 second-type measured values in the present disclosure respectively correspond to N2 first-type thresholds, the N1 first-type thresholds and the N2 first-type thresholds being real numbers; when the target radio resource in the present disclosure is the second radio resource in the present disclosure, size relationships respectively among the N1 second-type measured values and the corresponding first-type thresholds are used for determining the P1 second-type reference signal(s) out of the N1 second-type reference signals in the present disclosure, and any of the P1 second-type reference signal(s) is a second-type reference signal among the N1 second-type reference signals; when the target radio resource is the first radio resource in the present disclosure, size relationships respectively among the N2 second-type measured values and the corresponding first-type thresholds are used for determining the P1 second-type reference signal(s) out of the N2 second-type reference signals in the present disclosure, and any of the P1 second-type reference signal(s) is a second-type reference signal among the N2 second-type reference signals.

In one embodiment, when the target radio resource is the third radio resource, size relationships respectively among the N1 second-type measured values and the corresponding first-type thresholds and size relationships respectively among the N2 second-type measured values and N2 first-type thresholds are used for determining the P1 second-type reference signal(s) out of the N1 second-type reference signals and the N2 second-type reference signals.

In one embodiment, when the target radio resource is the second radio resource, the P1 second-type measured value(s) comprise(s) all second-type measured value(s) not less than the corresponding first-type threshold(s) in the N1 second-type measured values, and the P1 second-type reference signal(s) is(are) respectively used for generating the P1 second-type measured value(s).

In one embodiment, when the target radio resource is the first radio resource, the P1 second-type measured value(s) comprise(s) all second-type measured value(s) not less than the corresponding first-type threshold(s) in the N2 second-type measured values, and the P1 second-type reference signal(s) is(are) respectively used for generating the P1 second-type measured value(s).

In one embodiment, when the target radio resource is the third radio resource, the P1 second-type measured value(s) comprise(s) all second-type measured value(s) not less than the corresponding first-type threshold(s) among the N1 second-type measured values and the N2 second-type measured values, and the P1 second-type reference signal(s) is(are) respectively used for generating the P1 second-type measured value(s).

In one embodiment, the N1 first-type thresholds are the same.

In one embodiment, there are two first-type thresholds among the N1 first-type thresholds being different.

In one embodiment, the N2 first-type thresholds are the same.

In one embodiment, there are two first-type thresholds among the N2 first-type thresholds being different.

In one embodiment, the N1 first-type thresholds and the N2 first-type thresholds are the same.

In one embodiment, the N1 first-type thresholds and the N2 first-type thresholds are configured independently.

In one embodiment, there exist a first-type threshold among the N1 first-type thresholds and a first-type threshold among the N2 first-type thresholds being different.

In one embodiment, the first-type threshold is relevant to a type of the second-type reference signal.

In one subembodiment of the above embodiment, types of the N1 second-type reference signals are the same, and the N1 first-type thresholds are the same.

In one subembodiment of the above embodiment, there are types of two second-type reference signals among the N1 second-type reference signals being different, and there are two first-type thresholds among the N1 first-type thresholds being different.

In one subembodiment of the above embodiment, a first given reference signal and a second given reference signal are respectively any two second-type reference signals among the N1 second-type reference signals; when types of the first given reference signal and the second given reference signal are the same, two first-type thresholds among the N1 first-type thresholds respectively corresponding to the first given reference signal and the second given reference signal are the same; when types of the first given reference signal and the second given reference signal are different, two first-type thresholds among the N1 first-type thresholds respectively corresponding to the first given reference signal and the second given reference signal are different.

In one subembodiment of the above embodiment, types of the N2 second-type reference signals are the same, and the N2 first-type thresholds are the same.

In one subembodiment of the above embodiment, there are types of two second-type reference signals among the N2 second-type reference signals being different, and there are two first-type thresholds among the N2 first-type thresholds being different.

In one subembodiment of the above embodiment, a third given reference signal and a fourth given reference signal are respectively any two second-type reference signals among the N2 second-type reference signals; when types of the third given reference signal and the fourth given reference signal are the same, two first-type thresholds among the N2 first-type thresholds respectively corresponding to the third given reference signal and the fourth given reference signal are the same; when types of the third given reference signal and the fourth given reference signal are different, two first-type thresholds among the N2 first-type thresholds respectively corresponding to the third given reference signal and the fourth given reference signal are different.

In one subembodiment of the above embodiment, a fifth given reference signal and a sixth given reference signal are respectively any two second-type reference signals among the N1 second-type reference signals and the N2 second-type reference signals; when types of the fifth given reference signal and the sixth given reference signal are the same, the first-type thresholds respectively corresponding to the fifth given reference signal and the sixth reference signal are the same; when types of the fifth given reference signal and the sixth given reference signal are different, the first-type thresholds respectively corresponding to the fifth given reference signal and the sixth reference signal are different.

In one subembodiment of the above embodiment, a type of the second-type reference signal comprises at least one of a CSI-RS or a SS/PBCH block.

In one subembodiment of the above embodiment, a type of the second-type reference signal is SS/PBCH block, the first-type threshold is configured by rsrp-ThresholdSSB, and the specific definition of the rsrp-ThresholdSSB can be found in 3GPP TS38.213, chapter 6.

In one subembodiment of the above embodiment, a type of the second-type reference is CSI-RS, the first-type threshold is determined together by rsrp-ThresholdSSB and powerControlOffsetSS, and the specific definition of the rsrp-ThresholdSSB and the powerControlOffsetSS can be found in 3GPP TS38.213, chapter 6.

In one embodiment, the first-type threshold is a real number.

In one embodiment, the second-type measured value is a RSRP value, and the first-type threshold is measured by dBm.

In one embodiment, the second-type measured value is a RSRQ value, and the first-type threshold is measured by dB.

In one embodiment, the first-type threshold is $Q_{in,LR}$, and the specific definition of $Q_{in,LR}$ can be found in 3GPP TS38.213, chapter 6.

Embodiment 14

Figure 14:
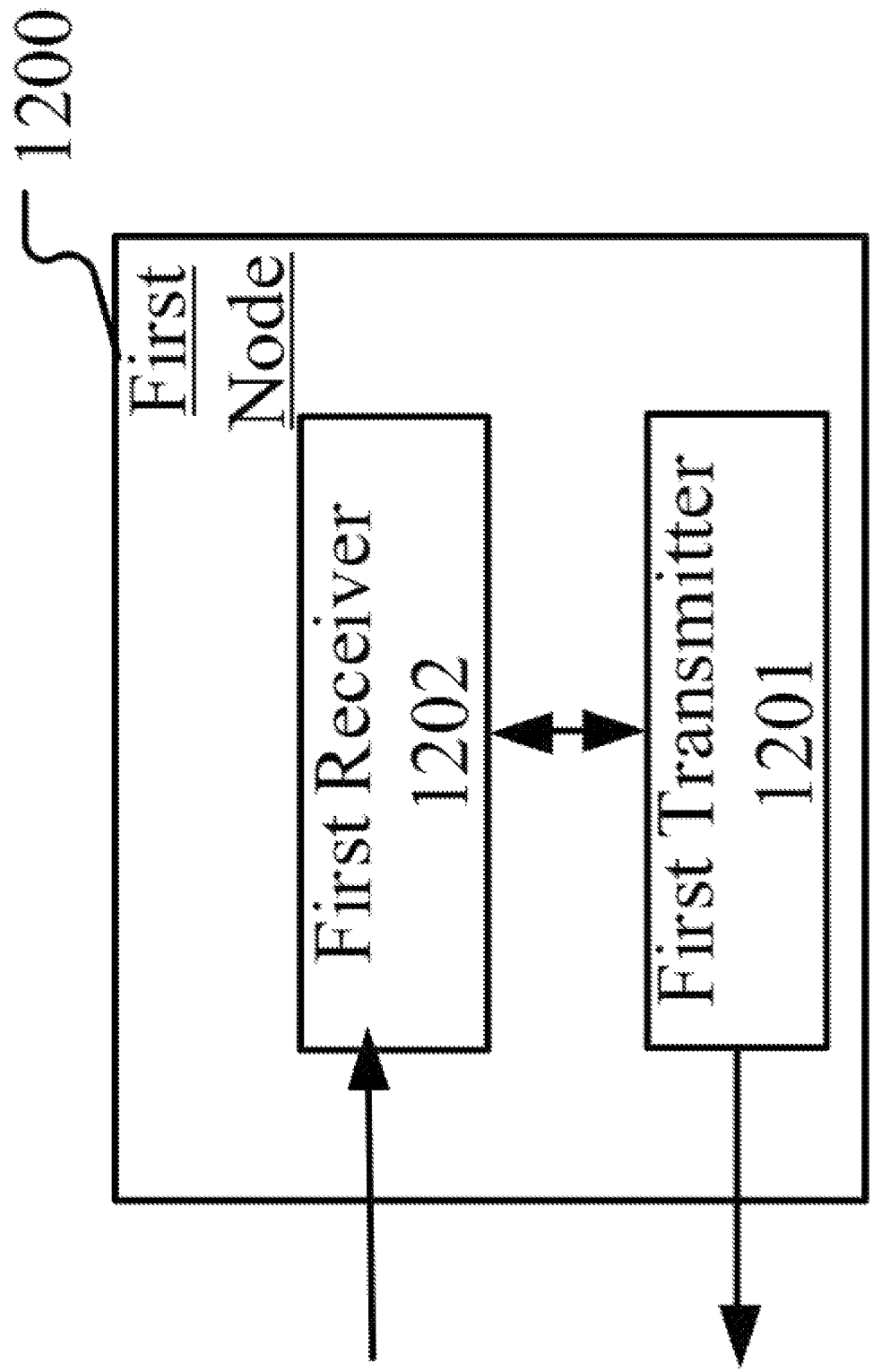
FIG. 14 illustrates a structure block diagram of a processing apparatus in a first node according to one embodiment of the present disclosure.

Embodiment 14 illustrates a structural block diagram of a processing apparatus in a first node, as shown in FIG. 14. In FIG. 14, a first node processing apparatus 1200 comprises a first transmitter 1201 and a first receiver 1202.

In one embodiment, the first node 1200 is a UE.

In one embodiment, the first node 1200 is a relay node.

In one embodiment, the first node 1200 is a base station.

In one embodiment, the first node 1200 is a vehicle-mounted communication device.

In one embodiment, the first node 1200 is a UE supporting V2X communications.

In one embodiment, the first node 1200 is a relay node supporting V2X communications.

In one embodiment, the first transmitter 1201 comprises at least one of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1201 comprises at least the first five of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1201 comprises at least the first four of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1201 comprises at least the first three of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first transmitter 1201 comprises at least the first two of an antenna 452, a transmitter 454, a multi-antenna transmitting processor 457, a transmitting processor 468, a controller/processor 459, a memory 460, or a data source 467 in FIG. 4 of the present disclosure.

In one embodiment, the first receiver 1202 comprises at least one of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first five of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first four of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first three of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first two of an antenna 452, a receiver 454, a multi-antenna receiving processor 458, a receiving processor 456, a controller/processor 459, a memory 460 or a data source 467 in FIG. 4 of the present disclosure.

a first receiver 1202, receives M1 first-type reference signals, measurements for the M1 first-type reference signals being used for generating first radio-link quality, M1 being a positive integer greater than 1; receives M2 first-type reference signals, measurements for the M2 first-type reference signals being used for generating second radio-link quality, M2 being a positive integer greater than 1;

a first transmitter 1201, transmits a first radio signal on a target radio resource;

in Embodiment 14, the first radio-link quality and the second radio-link quality respectively correspond to a first threshold and a second threshold, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource or a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one embodiment, the first radio resource and the second radio resource are both reserved for a first-type physical-layer channel, and the third radio resource is reserved for a second-type physical-layer channel, the first-type physical-layer channel and the second-type physical-layer channel being different.

In one embodiment, when the first radio-link quality is worse than the first threshold and the second radio-link quality is not worse than the second threshold, the target radio resource is the second radio resource; when the first radio-link quality is not worse than the first threshold and the second radio-link quality is worse than the second threshold, the target radio resource is the first radio resource; when the first radio-link quality is worse than the first threshold and the second radio-link quality is worse than the second threshold, the target radio resource is the third radio resource.

In one embodiment, the first receiver 1202 receives third information, the third information being used for indicating N1 second-type reference signals; receives fourth information, the fourth information being used for indicating N2 second-type reference signals; when the target radio resource is the second radio resource, receives the N1 second-type reference signals, and measurements for the N1 second-type reference signals are respectively used for generating N1 second-type measured values; when the target radio resource is the first radio resource, receives the N2 second-type reference signals, and measurements for the N2 second-type reference signals are respectively used for generating N2 second-type measurement values; herein, the first index is used for determining the N1 second-type reference signals, and the second index is used for determining the N2 second-type reference signals; a target reference signal is used for generating the first radio signal; when the target radio resource is the second radio resource, the target reference signal is one of the N1 second-type reference signals; when the target radio resource is the first radio resource, the target reference signal is one of the N2 second-type reference signals; N1 is a positive integer greater than 1, and N2 is a positive integer greater than 1.

In one embodiment, the first transmitter 1201 transmits a first report; the first receiver 1202 receives first indication information; herein, the first report is used for indicating P1 second-type reference signal(s); the first indication information is used for indicating the target reference signal, the target reference signal being one of the P1 second-type reference signal(s), P1 being a positive integer; when the target radio resource is the second radio resource, size relationships respectively between the N1 second-type measured values and N1 first-type thresholds are used for determining the P1 second-type reference signal(s) out of the N1 second-type reference signals; when the target radio resource is the first radio resource, size relationships respectively between the N2 second-type measured values and N2 first-type thresholds are used for determining the P1 second-type reference signal(s) out of the N2 second-type reference signals.

In one embodiment, the first receiver 1202 receives second information; herein, the second information is used for indicating the first radio resource, the second radio resource and the third radio resource.

In one embodiment, the first receiver 1202 receives first information; herein, the first information is used for determining the first index and the second index.

Embodiment 15

Figure 15:
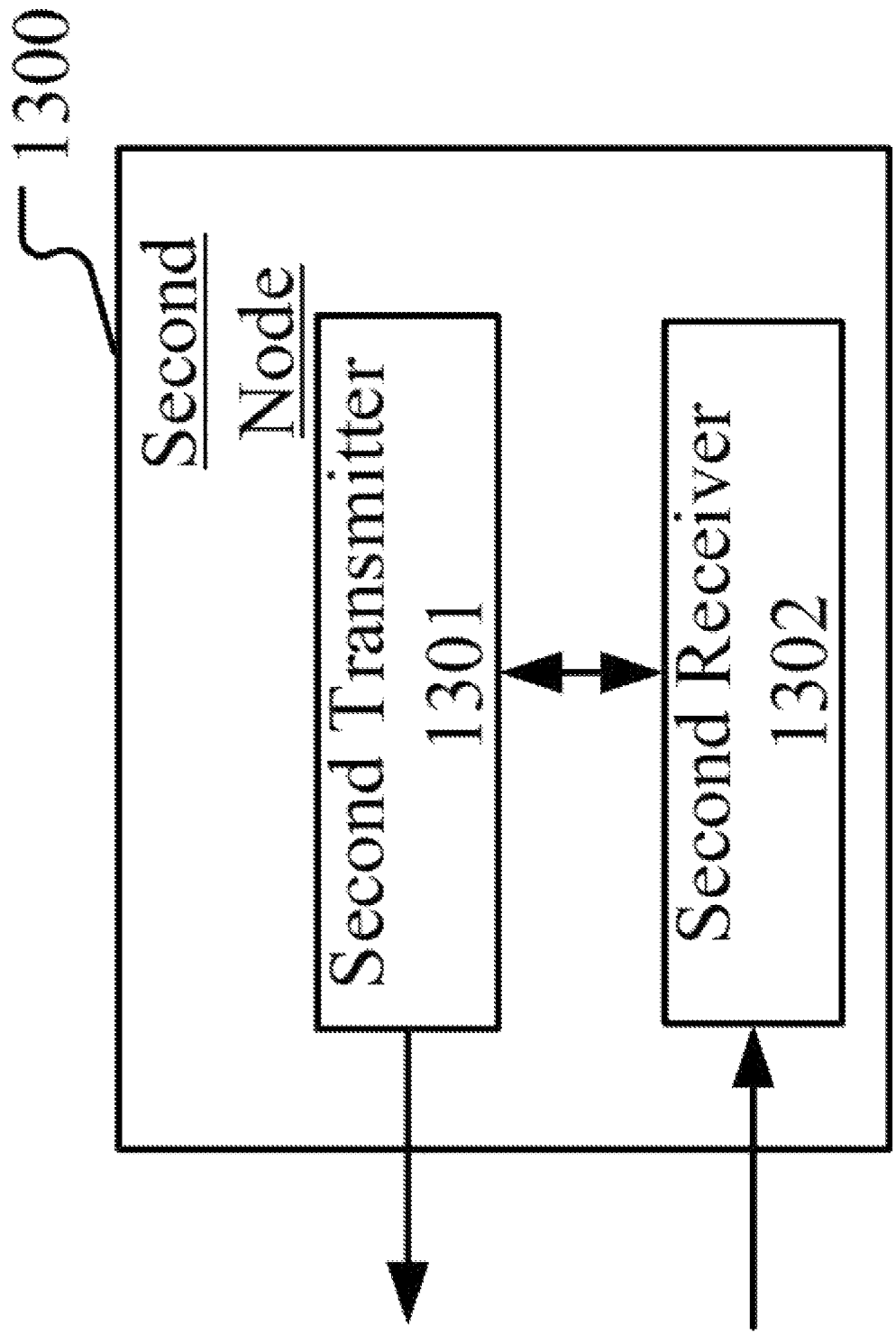
FIG. 15 illustrates a structure block diagram of a processing apparatus in second node according to one embodiment of the present disclosure.

Embodiment 15 illustrates a structural block diagram of a processing apparatus in a second node, as shown in FIG. 15. In FIG. 15, a second node processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first five of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first four of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first three of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first two of an antenna 420, a transmitter 418, a multi-antenna transmitting processor 471, a transmitting processor 416, a controller/processor 475 or a memory 476 in FIG. 4 of the present disclosure.

In one embodiment, the second receiver 1302 comprises at least one of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first five of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first four of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first three of an antenna 420, a receiver 418, a multi-antenna receiving processor 472, a receiving processor 470, a controller/processor 475 or a memory 476 in FIG. 4 of the present disclosure.

In one embodiment, the second receiver 1302 comprises at least the first two of an antenna 420, a receiver 418, a multi-antenna receiving processor 472, a receiving processor 470, a controller/processor 475 or a memory 476 in FIG. 4 of the present disclosure.

a second transmitter 1301, transmits M1 first-type reference signals, measurements for the M1 first-type reference signals being used for generating first radio-link quality, M1 being a positive integer greater than 1; transmits M2 first-type reference signals, measurements for the M2 first-type reference signals being used for generating second radio-link quality, M2 being a positive integer greater than 1;

a second receiver 1302, receives a first radio signal on a target radio resource;

in Embodiment 15, the first radio-link quality and the second radio-link quality respectively correspond to a first threshold and a second threshold, at least one of the first radio-link quality and the second radio-link quality is worse than its corresponding threshold, the first threshold and the second threshold both being real numbers; the first radio-link quality and the second radio-link quality are used for determining the target radio resource and the first radio signal; the target radio resource is one of a first radio resource, a second radio resource or a third radio resource; the first radio resource and the second radio resource correspond to a first index and a second index respectively, the first index and the second index being two different non-negative integers; the first index is used for determining the M1 first-type reference signals, and the second index is used for determining the M2 first-type reference signals.

In one embodiment, the first radio resource and the second radio resource are both reserved for a first-type physical-layer channel, and the third radio resource is reserved for a second-type physical-layer channel, the first-type physical-layer channel and the second-type physical-layer channel being different.

In one embodiment, when the first radio-link quality is worse than the first threshold and the second radio-link quality is not worse than the second threshold, the target radio resource is the second radio resource; when the first radio-link quality is not worse than the first threshold and the second radio-link quality is worse than the second threshold, the target radio resource is the first radio resource; when the first radio-link quality is worse than the first threshold and the second radio-link quality is worse than the second threshold, the target radio resource is the third radio resource.

In one embodiment, the second transmitter 1301 transmits third information, the third information being used for indicating N1 second-type reference signals; transmits fourth information, the fourth information being used for indicating N2 second-type reference signals; transmits the N1 second-type reference signals; and transmits the N2 second-type reference signals; wherein the first index is used for determining the N1 second-type reference signals, and the second index is used for determining the N2 second-type reference signals; a target reference signal is used for generating the first radio signal; when the target radio resource is the second radio resource, the target reference signal is one of the N1 second-type reference signals; when the target radio resource is the first radio resource, the target reference signal is one of the N2 second-type reference signals; N1 is a positive integer greater than 1, and N2 is a positive integer greater than 1.

In one embodiment, the second transmitter 1301 transmits second information; wherein the second information is used for indicating the first radio resource, the second radio resource and the third radio resource.

In one embodiment, the second transmitter 1301 transmits first information; wherein the first information is used for determining the first index and the second index.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communication, comprising:

a first receiver, receiving M1 first-type reference signals, measurements for the M1 first-type reference signals being used for generating first radio-link quality, M1 being a positive integer greater than 1; receiving M2 first-type reference signals, measurements for the M2 first-type reference signals being used for generating second radio-link quality, M2 being a positive integer greater than 1; and a first transmitter, transmitting a first radio signal on a target radio resource;

wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers, and the first threshold is the same as the second threshold; the first radio-link quality and the second radio-link quality are used for determining the target radio resource from a first radio resource, a second radio resource and a third radio resource, and for determining the first radio signal; the first radio resource and the second radio resource are allocated to a same type of physical-layer channel, and the first radio resource and the third radio resource are allocated to different types of physical-layer channels; the first radio resource and the second radio resource correspond to a first index and a second index respectively, the first index and the second index being two different non-negative integers; the first index is used for determining the M1 first-type reference signals, and the second index is used for determining the M2 first-type reference signals; the M1 first-type reference signals are used for a beam failure detection in a beam failure recovery mechanism, and the M2 first-type reference signals are used for a beam failure detection in a beam failure recovery mechanism; the M1 first-type reference signals comprise a periodic CSI-RS, and the M2 first-type reference signals comprise a periodic CSI-RS.

2. The first node according to claim 1, wherein the first index and the second index respectively correspond to the first time-frequency-resource set and the second time-frequency-resource set, and the first node monitors a downlink physical-layer control channel in a first time-frequency-resource set and a second time-frequency-resource set; the M1 first-type reference signals comprise part or all of reference signals indicated by a positive integer number of Transmission Configuration Indicator (TCI) State(s) used in monitoring the downlink physical-layer control channel in the first time-frequency-resource set, and the M2 first-type reference signals comprise part or all of reference signals indicated by a positive integer number of TCI State(s) used in monitoring the downlink physical-layer control channel in the second time-frequency-resource set; the downlink physical-layer control channel is a PDCCH.

3. The first node according to claim 1, wherein when the first radio-link quality is worse than the first threshold, and the second radio-link quality is not worse than the second threshold, the target radio resource is the second radio resource; when the first radio-link quality is not worse than the first threshold, and the second radio-link quality is worse than the second threshold, the target radio resource is the first radio resource.

4. The first node according to claim 3, wherein when the first radio-link quality is worse than the first threshold, and the second radio-link quality is worse than the second threshold, the target radio resource is the third radio resource.

5. The first node according to claim 1, wherein the first receiver receives third information, the third information being used for indicating N1 second-type reference signals; receives fourth information, the fourth information being used for indicating N2 second-type reference signals; the third information and the fourth information belong to a same IE in an RRC signaling; the first index is used for determining the N1 second-type reference signals, and the second index is used for determining the N2 second-type reference signals; the N1 second-type reference signals comprise at least one of a periodic CSI-RS or a SS/PBCH block, and the N2 second-type reference signals comprise at least one of a periodic CSI-RS or a SS/PBCH Block; N1 is a positive integer greater than 1, and N2 is a positive integer greater than 1; a target reference signal is used for generating the first radio signal;

when the first radio-link quality is worse than the first threshold and the second radio-link quality is worse than the second threshold, the target radio resource is the third radio resource, and the target reference signal is one second-type reference signal among the N1 second-type reference signals and the N2 second-type reference signals;

when the target radio resource is the first radio resource or the second radio resource, the first receiver receives fifth information, and the first transmitter transmits a second radio signal; the target reference signal is used for triggering transmission of the first radio signal; the first radio signal is used for requesting transmission of the fifth information, the fifth information being used for indicating time-frequency resources occupied by the second radio signal; the second radio signal carries a second bit block, the second bit block is used for indicating the target reference signal; a transmission time of the fifth information is later than a transmission time of the first radio signal, and a transmission time of the second radio signal is later than a transmission time of the fifth information; and the second bit block comprises a positive integer number of bit(s).

6. The first node according to claim 5, wherein the first node maintains a first counter, a value of the first counter indicates times of beam failure instance; when the value of the first counter reaches a third threshold, a first information is transmitted, and the first indication information is transferred inside the first node from a higher layer to a physical layer; the first indication information is used for indicating the target reference signal, the target reference signal being one of the P1 second-type reference signal(s), P1 being a positive integer;

a first report is used for indicating the P1 second-type reference signal(s) and P1 second-type measured value(s), and the first report is transferred inside the first node from a physical layer to a higher layer; measurements for the N1 second-type reference signals are respectively used for generating N1 second-type measured values, and measurements for the N2 second-type reference signals are respectively used for generating N2 second-type measurement values; the N1 second-type measured values respectively correspond to N1 first-type thresholds, the N2 second-type measured values respectively correspond to N2 first-type thresholds, and the N1 first-type thresholds and the N2 first-type thresholds being real numbers; the second-type measured value is a RSRP value; when the target radio resource is the third radio resource, the P1 second-type measured value(s) comprise(s) all second-type measured value(s) not less than the corresponding first-type threshold(s) among the N1 second-type measured values and the N2 second-type measured values, and the P1 second-type reference signal(s) is(are) respectively used for generating the P1 second-type measured value(s).

7. A second node for wireless communication, comprising:
- a second transmitter, transmitting M1 first-type reference signals, measurements for the M1 first-type reference signals being used for generating first radio-link quality, M1 being a positive integer greater than 1; transmitting M2 first-type reference signals, measurements for the M2 first-type reference signals being used for generating second radio-link quality, M2 being a positive integer greater than 1; and
- a second receiver, receiving a first radio signal on a target radio resource;
- wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers, and the first threshold is the same as the second threshold; the first radio-link quality and the second radio-link quality are used for determining the target radio resource from a first radio resource, a second radio resource and a third radio resource, and for determining the first radio signal; the first radio resource and the second radio resource are allocated to a same type of physical-layer channel, and the first radio resource and the third radio resource are allocated to different types of physical-layer channels; the first radio resource and the second radio resource correspond to a first index and a second index respectively, the first index and the second index being two different non-negative integers; the first index is used for determining the M1 first-type reference signals, and the second index is used for determining the M2 first-type reference signals; the M1 first-type reference signals are used for a beam failure detection in a beam failure recovery mechanism, and the M2 first-type reference signals are used for a beam failure detection in a beam failure recovery mechanism; the M1 first-type reference signals comprise a periodic CSI-RS, and the M2 first-type reference signals comprise a periodic CSI-RS.

8. The second node according to claim 7, wherein the first index and the second index respectively correspond to the first time-frequency-resource set and the second time-frequency-resource set, and the first node monitors a downlink physical-layer control channel in a first time-frequency-resource set and a second time-frequency-resource set; the M1 first-type reference signals comprise part or all of reference signals indicated by a positive integer number of Transmission Configuration Indicator (TCI) State(s) used in monitoring the downlink physical-layer control channel in the first time-frequency-resource set, and the M2 first-type reference signals comprise part or all of reference signals indicated by a positive integer number of TCI State(s) used in monitoring the downlink physical-layer control channel in the second time-frequency-resource set; the downlink physical-layer control channel is a PDCCH.

9. The second node according to claim 7, wherein when the first radio-link quality is worse than the first threshold and the second radio-link quality is not worse than the second threshold, the target radio resource is the second radio resource; when the first radio-link quality is not worse than the first threshold, and the second radio-link quality is worse than the second threshold, the target radio resource is the first radio resource; when the first radio-link quality is worse than the first threshold, and the second radio-link quality is worse than the second threshold, the target radio resource is the third radio resource.

10. The second node according to claim 7, wherein the second transmitter transmits third information, the third information being used for indicating N1 second-type reference signals; transmits fourth information, the fourth information being used for indicating N2 second-type reference signals; the third information and the fourth information belong to a same IE in an RRC signaling; the first index is used for determining the N1 second-type reference signals, and the second index is used for determining the N2 second-type reference signals; the N1 second-type reference signals comprise at least one of a periodic CSI-RS or a SS/PBCH block, and the N2 second-type reference signals comprise at least one of a periodic CSI-RS or a SS/PBCH Block; N1 is a positive integer greater than 1, and N2 is a positive integer greater than 1; a target reference signal is used for generating the first radio signal;
- when the first radio-link quality is worse than the first threshold and the second radio-link quality is worse than the second threshold, the target radio resource is the third radio resource, and the target reference signal is one second-type reference signal among the N1 second-type reference signals and the N2 second-type reference signals;
- when the target radio resource is the first radio resource or the second radio resource, the second transmitter transmits fifth information, and the second receiver receives a second radio signal; the target reference signal is used for triggering transmission of the first radio signal; the first radio signal is used for requesting transmission of the fifth information, the fifth information being used for indicating time-frequency resources occupied by the second radio signal; the second radio signal carries a second bit block, the second bit block is used for indicating the target reference signal; a transmission time of the fifth information is later than a transmission time of the first radio signal, and a transmission time of the second radio signal is later than a transmission time of the fifth information; and the second bit block comprises a positive integer number of bit(s).

11. A method in a first node for wireless communication, comprising:
- receiving M1 first-type reference signals, measurements for the M1 first-type reference signals being used for generating first radio-link quality, M1 being a positive integer greater than 1;
- receiving M2 first-type reference signals, measurements for the M2 first-type reference signals being used for generating second radio-link quality, M2 being a positive integer greater than 1; and
- transmitting a first radio signal on a target radio resource;
- wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers, and the first threshold is the same as the second threshold; the first radio-link quality and the second radio-link quality are used for determining the target radio resource from a first radio resource, a second radio resource and a third radio resource, and for determining the first radio signal; the first radio resource and the second radio resource are allocated to a same type of physical-layer channel, and the first radio resource and the third radio resource are allocated to different types of physical-layer channels; the first radio resource and the second radio resource correspond to a first index and a second index respectively, the first index and the second index being two different non-negative integers; the first index is used for determining the M1 first-type reference signals, and the second index is used for determining the M2 first-type reference signals; the M1 first-type reference signals are used for a beam failure detection in a beam failure recovery mechanism, and the M2 first-type reference signals are used for a beam failure detection in a beam failure recovery mechanism; the M1 first-type reference signals comprise a periodic CSI-RS, and the M2 first-type reference signals comprise a periodic CSI-RS.

12. The method according to claim 11, wherein the first index and the second index respectively correspond to the first time-frequency-resource set and the second time-frequency-resource set, and the first node monitors a downlink physical-layer control channel in a first time-frequency-resource set and a second time-frequency-resource set; the M1 first-type reference signals comprise part or all of reference signals indicated by a positive integer number of Transmission Configuration Indicator (TCI) State(s) used in monitoring the downlink physical-layer control channel in the first time-frequency-resource set, and the M2 first-type reference signals comprise part or all of reference signals indicated by a positive integer number of TCI State(s) used in monitoring the downlink physical-layer control channel in the second time-frequency-resource set; the downlink physical-layer control channel is a PDCCH.

13. The method according to claim 11, wherein when the first radio-link quality is worse than the first threshold and the second radio-link quality is not worse than the second threshold, the target radio resource is the second radio resource; when the first radio-link quality is not worse than the first threshold, and the second radio-link quality is worse than the second threshold, the target radio resource is the first radio resource.

14. The method according to claim 13, wherein when the first radio-link quality is worse than the first threshold, and the second radio-link quality is worse than the second threshold, the target radio resource is the third radio resource.

15. The method according to claim 11, comprising:
receiving third information, the third information being used for indicating N1 second-type reference signals; and
receiving fourth information, the fourth information being used for indicating N2 second-type reference signals; the third information and the fourth information belong to a same IE in an RRC signaling; the first index is used for determining the N1 second-type reference signals, and the second index is used for determining the N2 second-type reference signals; the N1 second-type reference signals comprise at least one of a periodic CSI-RS or a SS/PBCH block, and the N2 second-type reference signals comprise at least one of a periodic CSI-RS or a SS/PBCH Block; N1 is a positive integer greater than 1, and N2 is a positive integer greater than 1; a target reference signal is used for generating the first radio signal;

when the first radio-link quality is worse than the first threshold and the second radio-link quality is worse than the second threshold, the target radio resource is the third radio resource, and the target reference signal is one second-type reference signal among the N1 second-type reference signals and the N2 second-type reference signals;

when the target radio resource is the first radio resource or the second radio resource, comprising: receiving fifth information, and transmitting a second radio signal; the target reference signal is used for triggering transmission of the first radio signal; the first radio signal is used for requesting transmission of the fifth information, the fifth information being used for indicating time-frequency resources occupied by the second radio signal; the second radio signal carries a second bit block, the second bit block is used for indicating the target reference signal; a transmission time of the fifth information is later than a transmission time of the first radio signal, and a transmission time of the second radio signal is later than a transmission time of the fifth information; and the second bit block comprises a positive integer number of bit(s).

16. The method according to claim 15, wherein the first node maintains a first counter, a value of the first counter indicates times of beam failure instance; when the value of the first counter reaches a third threshold, a first information is transmitted, and the first indication information is transferred inside the first node from a higher layer to a physical layer; the first indication information is used for indicating the target reference signal, the target reference signal being one of the P1 second-type reference signal(s), P1 being a positive integer;

a first report is used for indicating the P1 second-type reference signal(s) and P1 second-type measured value(s), and the first report is transferred inside the first node from a physical layer to a higher layer; measurements for the N1 second-type reference signals are respectively used for generating N1 second-type measured values, and measurements for the N2 second-type reference signals are respectively used for generating N2 second-type measurement values; the N1 second-type measured values respectively correspond to N1 first-type thresholds, the N2 second-type measured values respectively correspond to N2 first-type thresholds, and the N1 first-type thresholds and the N2 first-type thresholds being real numbers; the second-type measured value is a RSRP value; when the target radio resource is the third radio resource, the P1 second-type measured value(s) comprise(s) all second-type measured value(s) not less than the corresponding first-type threshold(s) among the N1 second-type measured values and the N2 second-type measured values, and the P1 second-type reference signal(s) is(are) respectively used for generating the P1 second-type measured value(s).

17. A method in a second node for wireless communication, comprising:
transmitting M1 first-type reference signals, measurements for the M1 first-type reference signals being used for generating first radio-link quality, M1 being a positive integer greater than 1;
transmitting M2 first-type reference signals, measurements for the M2 first-type reference signals being used for generating second radio-link quality, M2 being a positive integer greater than 1; and receiving a first radio signal on a target radio resource;

wherein the first radio-link quality and the second radio-link quality correspond to a first threshold and a second threshold respectively, at least one of the first radio-link quality and the second radio-link quality is worse than its corresponding threshold, the first threshold and the second threshold both being real numbers, and the first threshold is the same as the second threshold; the first radio-link quality and the second radio-link quality are used for determining the target radio resource from a first radio resource, a second radio resource and a third radio resource, and for determining the first radio signal; the first radio resource and the second radio resource are allocated to a same type of physical-layer channel, and the first radio resource and the third radio resource are allocated to different types of physical-layer channels; the first radio resource and the second radio resource correspond to a first index and a second index respectively, the first index and the second index being two different non-negative integers; the first index is used for determining the M1 first-type reference signals, and the second index is used for determining the M2 first-type reference signals; the M1 first-type reference signals are used for a beam failure detection in a beam failure recovery mechanism, and the M2 first-type reference signals are used for a beam failure detection in a beam failure recovery mechanism; the M1 first-type reference signals comprise a periodic CSI-RS, and the M2 first-type reference signals comprise a periodic CSI-RS.

18. The method according to claim 17, wherein the first index and the second index respectively correspond to the first time-frequency-resource set and the second time-frequency-resource set, and the first node monitors a downlink physical-layer control channel in a first time-frequency-resource set and a second time-frequency-resource set; the M1 first-type reference signals comprise part or all of reference signals indicated by a positive integer number of Transmission Configuration Indicator (TCI) State(s) used in monitoring the downlink physical-layer control channel in the first time-frequency-resource set, and the M2 first-type reference signals comprise part or all of reference signals indicated by a positive integer number of TCI State(s) used in monitoring the downlink physical-layer control channel in the second time-frequency-resource set; the downlink physical-layer control channel is a PDCCH.

19. The second node according to claim 17, wherein when the first radio-link quality is worse than the first threshold and the second radio-link quality is not worse than the second threshold, the target radio resource is the second radio resource; when the first radio-link quality is not worse than the first threshold and the second radio-link quality is worse than the second threshold, the target radio resource is the first radio resource; when the first radio-link quality is worse than the first threshold and the second radio-link quality is worse than the second threshold, the target radio resource is the third radio resource.

20. The method according to claim 17, comprising:
transmitting third information, the third information being used for indicating N1 second-type reference signals;
transmitting fourth information, the fourth information being used for indicating N2 second-type reference signals;
wherein the third information and the fourth information belong to a same IE in an RRC signaling; the first index is used for determining the N1 second-type reference signals, and the second index is used for determining the N2 second-type reference signals; the N1 second-type reference signals comprise at least one of a periodic CSI-RS or a SS/PBCH block, and the N2 second-type reference signals comprise at least one of a periodic CSI-RS or a SS/PBCH Block; N1 is a positive integer greater than 1, and N2 is a positive integer greater than 1; a target reference signal is used for generating the first radio signal;
when the first radio-link quality is worse than the first threshold and the second radio-link quality is worse than the second threshold, the target radio resource is the third radio resource, and the target reference signal is one second-type reference signal among the N1 second-type reference signals and the N2 second-type reference signals;
when the target radio resource is the first radio resource or the second radio resource, comprising: transmitting fifth information, and receiving a second radio signal; the target reference signal is used for triggering transmission of the first radio signal; the first radio signal is used for requesting transmission of the fifth information, the fifth information being used for indicating time-frequency resources occupied by the second radio signal; the second radio signal carries a second bit block, the second bit block is used for indicating the target reference signal; a transmission time of the fifth information is later than a transmission time of the first radio signal, and a transmission time of the second radio signal is later than a transmission time of the fifth information; and the second bit block comprises a positive integer number of bit(s).

* * * * *